(12) United States Patent
Nies et al.

(10) Patent No.: US 7,931,045 B2
(45) Date of Patent: Apr. 26, 2011

(54) WATER SENSOR APPARATUS

(75) Inventors: Juergen Nies, Winchester, VA (US); Ha Van Duong, Winchester, VA (US); Chunling Zhao, Laurel, MD (US)

(73) Assignee: Melnor, Inc., Winchester, VA (US)

( * ) Notice: Subject to any disclaimer, the term of this patent is extended or adjusted under 35 U.S.C. 154(b) by 467 days.

(21) Appl. No.: 12/046,944

(22) Filed: Mar. 12, 2008

(65) Prior Publication Data

US 2008/0251601 A1   Oct. 16, 2008

Related U.S. Application Data

(60) Provisional application No. 60/906,818, filed on Mar. 14, 2007, provisional application No. 60/977,192, filed on Oct. 3, 2007.

(51) Int. Cl.
*F16K 17/36* (2006.01)

(52) U.S. Cl. .............. 137/78.3; 137/78.2; 137/411

(58) Field of Classification Search .......... 137/78.2, 137/78.3, 78.5, 80, 410, 411, 247.19, 315.16, 137/448, 484, 527, 625.44, 875; 239/65; 251/87, 177, 228, 298

See application file for complete search history.

(56) References Cited

U.S. PATENT DOCUMENTS

| | | | | |
|---|---|---|---|---|
| 1,969,427 A * | 8/1934 | Sander | .......... | 137/448 |
| 2,162,898 A * | 6/1939 | Rotter | .......... | 137/536 |
| 2,472,933 A * | 6/1949 | Anderson | .......... | 137/202 |
| 2,864,650 A | 12/1958 | Delamater | | |
| 2,991,938 A | 7/1961 | Norcross | | |
| 3,122,155 A | 2/1964 | Martinon | | |
| 3,127,108 A | 3/1964 | Harris | | |
| 3,790,306 A * | 2/1974 | Uefuji | .......... | 137/202 |
| 3,823,874 A | 7/1974 | Kroeck | | |
| 4,025,236 A * | 5/1977 | Fujiwara | .......... | 137/625.6 |
| 4,744,515 A | 5/1988 | Watanabe | | |
| 4,970,356 A | 11/1990 | Amos | | |

FOREIGN PATENT DOCUMENTS

FR    1 300 228 A    8/1962
GB    2 074 295 A   10/1981

OTHER PUBLICATIONS

Christy's Thrift Decorating:Conserving Water in Your Garden [online] May 16, 2008 [retrieved on Sep. 29, 2010]. Retrieved from the Internet <http://christys-thriftydecorating.blogspot.com/2008/05/conserving-water-in-your-garden.html>.*
Melnor.com product web page [online] 2009 [retrieved on Sep. 29, 2010]. Retrieved from the Internet <http://www.melnor.com/products-water-conservation.php>.*
Home Depot.com product web page [online] 2010 [retrieved on Sep. 29, 2010]. Retrieved from the Internet <http://www.homedepot.com/webapp/wcs/stores/servlet/ProductDisplay?storeId=10051&pr>.*
European Search Report issued Jun. 24, 2008 in corresponding application EPO 08 40 5075.

* cited by examiner

*Primary Examiner* — John Rivell
*Assistant Examiner* — Craig Price
(74) *Attorney, Agent, or Firm* — Westerman, Hattori, Daniels & Adrian, LLP

(57) ABSTRACT

A water sensor apparatus used in connection with a watering system. The water sensor apparatus includes a main housing comprising an inlet and an outlet. A valve mechanism is provided inside the main housing. The valve mechanism opens and closes the outlet of the main housing in response to a water level collected in the main housing and a water pressure entering the inlet of the main housing.

17 Claims, 22 Drawing Sheets

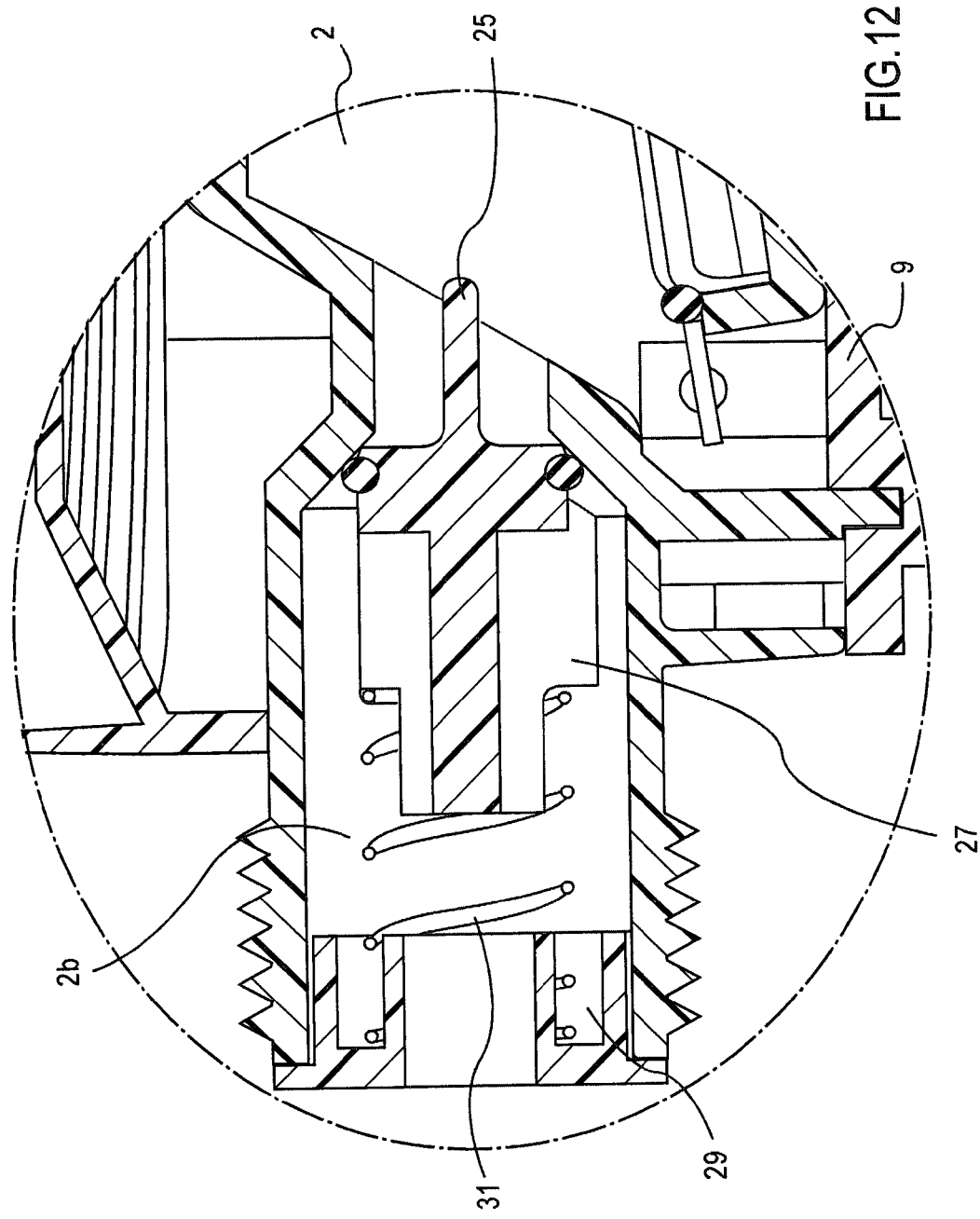

WATER SENSOR APPARATUS

BACKGROUND OF THE INVENTION

The invention generally relates to water valves, more particularly to valves used in a water sprinkler system.

The following description sets forth the inventor's knowledge of related art and some of the problems therein and should not be construed as an admission of knowledge in the prior art.

In the area of lawn watering, lawn sprinklers have been known and used for years. For example, square oscillating sprinklers have been used along with a water hose to water a given area of lawn. To make watering a lawn more convenient, programmable timers have also been known. A programmable timer can be used to set the time at which the lawn is to be watered. In a typical setup, a programmable timer is connected to a water source on one end and a hose on the other end, the hose being connected to a lawn sprinkler. A user could then program or set the water timer, and the sprinkler would come on at the designated time interval.

One drawback of this conventional system is that the designated time interval may be during or shortly after a rainfall. As such, the sprinkler will come on when the lawn is already wet. This may cause damage to lawn and at a minimum, is a waste of water.

SUMMARY OF THE INVENTION

One object of the present invention is to provide a water sensor apparatus having a main housing that includes a valve housing, a cover portion, and a base portion, wherein a float valve is connected to the base and provided in a lower portion of the main housing. The valve housing includes a main chamber (for housing valve mechanisms) and a water collection chamber for collecting rain water introduced into the main housing via an opening provided in the cover portion.

The main chamber includes an inlet valve provided in an inlet side portion of the main chamber. The inlet valve opens and closes by moving in a lateral direction. The valve closes by engaging the valve with an inlet valve seat so that fluid flow is blocked from entering the main chamber. The valve opens by disengaging the inlet valve from the inlet valve seat so that high pressure water can flow into the main chamber.

The main chamber also includes an outlet valve provided in an outlet side of the main chamber. The outlet valve also opens and closes by moving in a lateral direction. The valve closes by engaging the valve with an outlet valve seat so that fluid flow is blocked from reentering the main chamber (e.g., from a sprinkler apparatus). The valve opens by disengaging the valve from the outlet valve seat so that high pressure water can flow from the main chamber to an outlet of the main housing (the outlet can be connected to a sprinkler device).

The inlet side portion and the outlet side portion are approximately arranged on the same horizontal plane (e.g., so that fluid can flow without obstruction when the water timer is on and the float valve is open).

The main chamber also includes an overhead valve located in an upper portion of the main chamber. The overhead valve opens and closes by moving in a vertical direction. The valve opens by disengaging the valve from an overhead valve seat to introduce atmospheric pressure to the main chamber via an overhead aperture provided in the main chamber. The overhead valve closes by engaging the valve with the overhead valve seat to prevent pressure accumulated in the main chamber from exiting the main chamber via the overhead aperture.

In addition, a main chamber communication valve is provided in a lower side portion of the main chamber. The main chamber communication valve opens and closes by moving in a lateral direction. In general, the main chamber controls a flow of low pressure water from the water collection chamber to the main chamber. The main chamber communication valve opens by disengaging said main chamber communication valve with a main chamber communication valve seat. When main chamber communication valve is opened, a path is created for fluid to flow from the water collection chamber to the main chamber. The main chamber communication valve closes when the main chamber communication valve engages with the main chamber communication valve seat (e.g., prevents water from flowing from said water collection chamber to said main chamber).

The main chamber also includes a drain valve located in the lower side portion of the main chamber. The drain valve opens and closes by moving a predetermined distance in a lateral direction. In general, the drain valve communicates a flow of low pressure water from the water collection chamber to an opening in a bottom portion of the lower side portion. When the drain valve is open, for example, the main chamber communication valve is closed (e.g., so that there is only one path for the water collected in the water collection chamber to flow). The drain valve opens (e.g., unseals the opening provided on the bottom surface of the lower side portion of the main chamber), for example, in response to the water pressure inside the main chamber.

The lower side portion is provided on a horizontal plane below the inlet side portion and opens at one end to the lower portion of said main chamber.

In addition, the main chamber is in fluid communication with the water collection chamber and the float valve travels in a general vertical direction in response to a rising water level within said main chamber. For example, the float valve opens and closes the outlet of the housing in response to a water level collected in the main housing and a water pressure entering the inlet of the main housing.

Another object of the present invention is to provide a watering system for watering a lawn.

The watering system includes, for example, a water source (e.g., faucet), a water sensor apparatus, a water timer controller connected to the water source, a hose having a first end connected to the water timer controller and a second end connected to an inlet side of the water sensor apparatus, and a watering device connected to an outlet side of the water sensor apparatus.

In this watering system, the water timer controller controls the operation of a water supply from the water source to the water timer apparatus. The water controller includes, for example, an "on" condition and an "off" condition, wherein the "on" condition occurs during a watering cycle. In general, water flows from the water source to an inlet side of the water sensor apparatus during the "on" condition.

In this watering system, the water sensor apparatus collects rain water in a main housing of the apparatus. The water sensor apparatus includes a valve mechanism for opening and closing a conduit (e.g., extending from the inlet side of the water sensor apparatus to the outlet side of the water sensor apparatus) in inside the water sensor apparatus in response to the water timer controller condition (e.g., "on" and "off") and a level of said rain water collected in the main housing of the apparatus.

For example, the valve mechanism closes when the level of water collected is greater than a designed threshold (e.g., 0.125 inches, 0.350 inches, 0.500 inches, etc.) and the water timer controller is in the "on" condition. Whereas, the valve mechanism opens when the level of water collected is less than the designed threshold and the water timer controller is in the "on" condition.

Accordingly, water is prevented from flowing from the water source into the sprinkler device when the water collected in the water sensor apparatus is greater than a designed threshold.

BRIEF DESCRIPTION OF THE DRAWINGS

A preferred embodiment of the present invention will be described with reference to the accompanying drawings, wherein:

FIG. 12 is a partial cross-sectional view of valve B under conditions I and III;

DETAILED DESCRIPTION OF THE DRAWINGS

An embodiment of the present invention will now be described with reference to the drawings.

Figure 1:
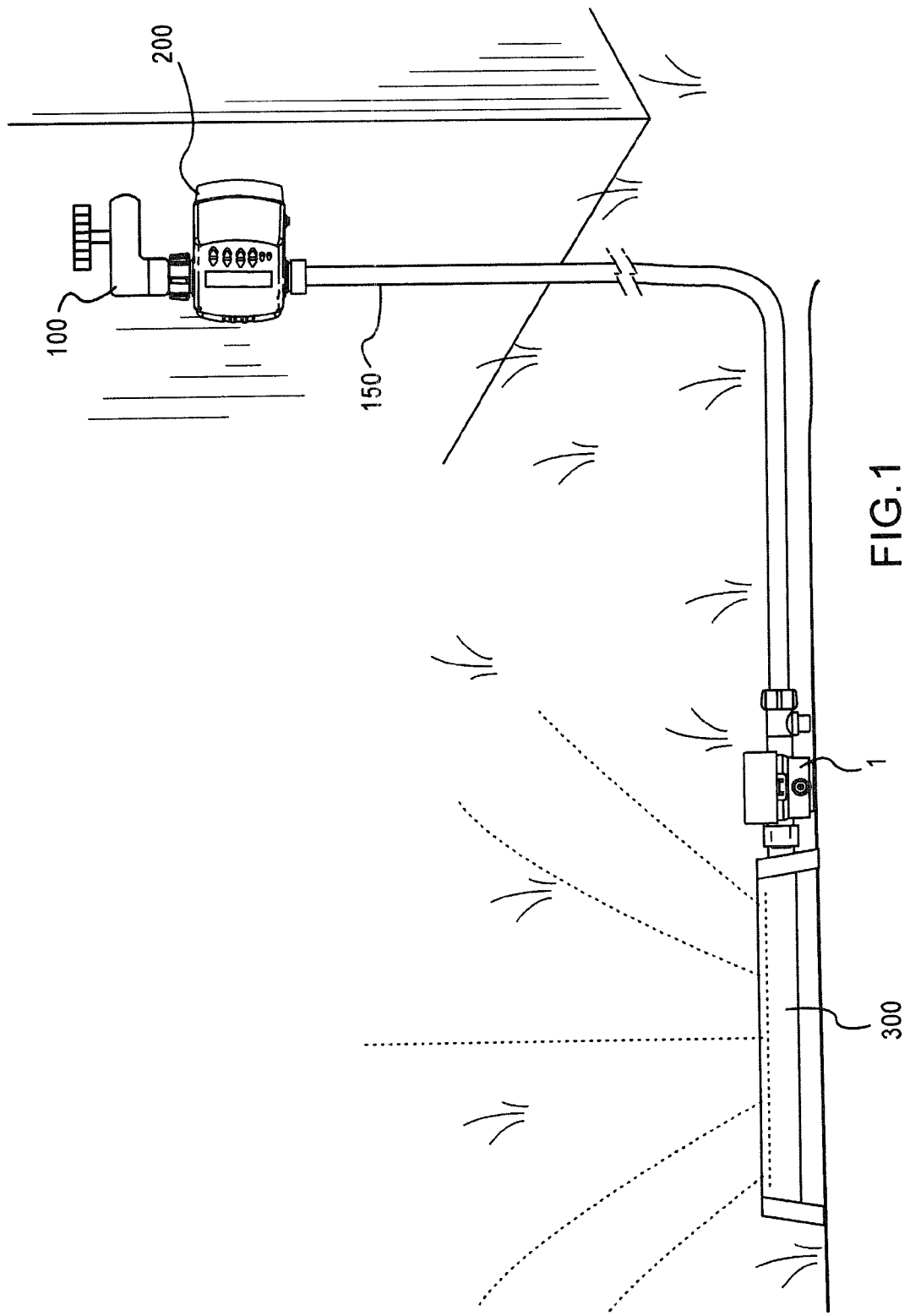
FIG. 1 is a view of a watering system for watering a lawn.

FIG. 1 illustrates a watering system that includes a water source 100, a water timer 200, a hose 150, a sprinkler 300, and a water sensor apparatus 1. The water sensor apparatus 1 is connected to the sprinkler 100 (e.g., sprinkler adaptor 19 attaches to a female port on sprinkler 300) at one end and the hose 150 at the other end (e.g., hose adaptor 21 is attached to outlet end of hose 150). The water timer 200 is connected to water source 100 (e.g., faucet) and controls the operation of the water supply (e.g., the water timer is "on" during a watering cycle and "off" between watering cycles) so that water is supplied to the sprinkler 300 at intervals and durations determined by a user, all in a manner now well known in the art of lawn sprinkler systems.

The water sensor apparatus 1 is designed to include a novel arrangement of chambers and valves in order to interrupt the regular program set into the water timer 200 so that water is not supplied to the sprinkler 300 after a predetermined amount of rain has fallen in the area desired to be watered. Furthermore, the water sensor apparatus 1 is entirely mechanical (e.g., no solenoid valves or electricity is required) and is compatible with conventional hoses, electronic water timers, and portable sprinkler devices.

Figure 2:
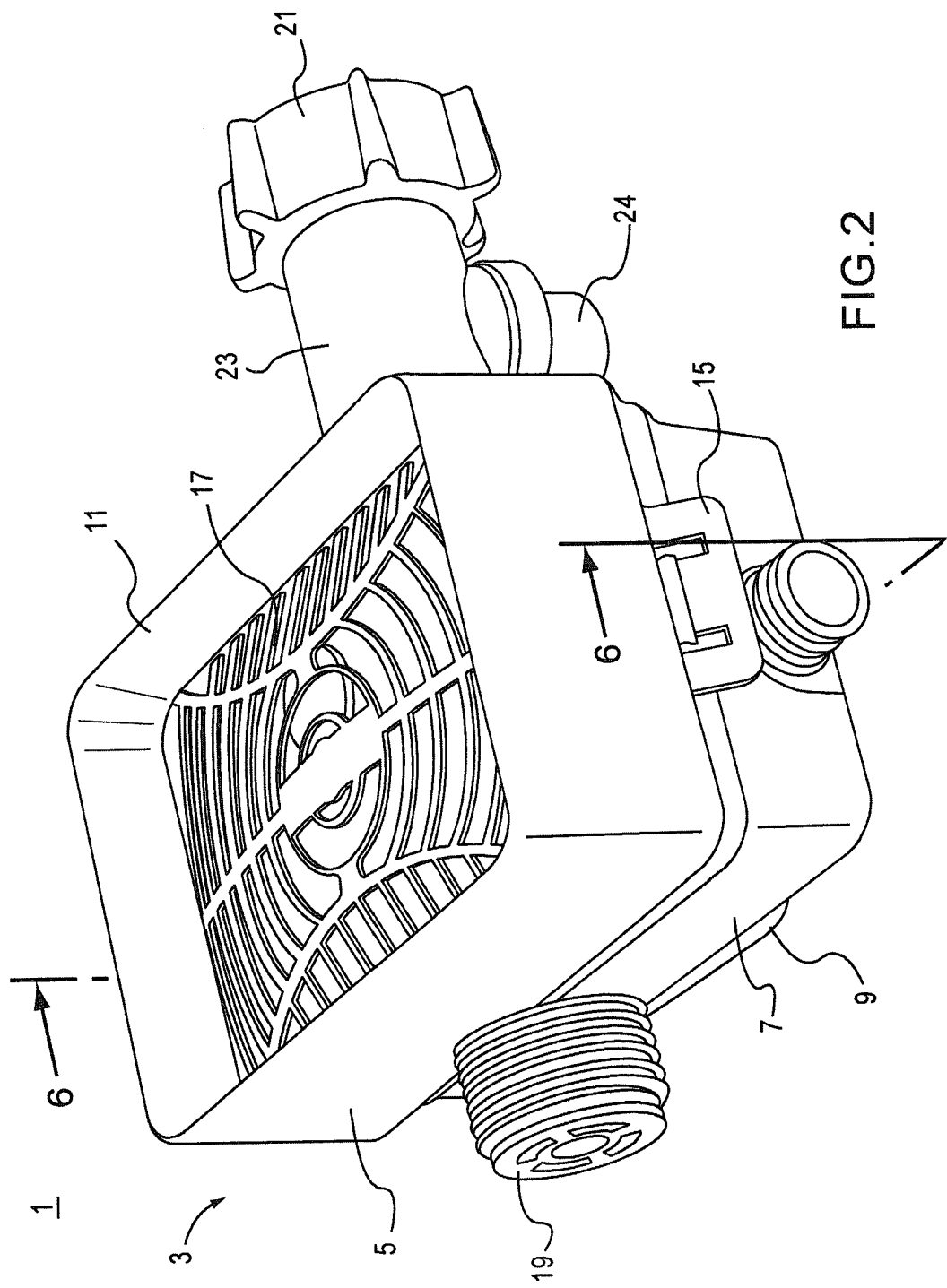
FIG. 2 is a perspective view of a water sensor apparatus.
Figure 3:
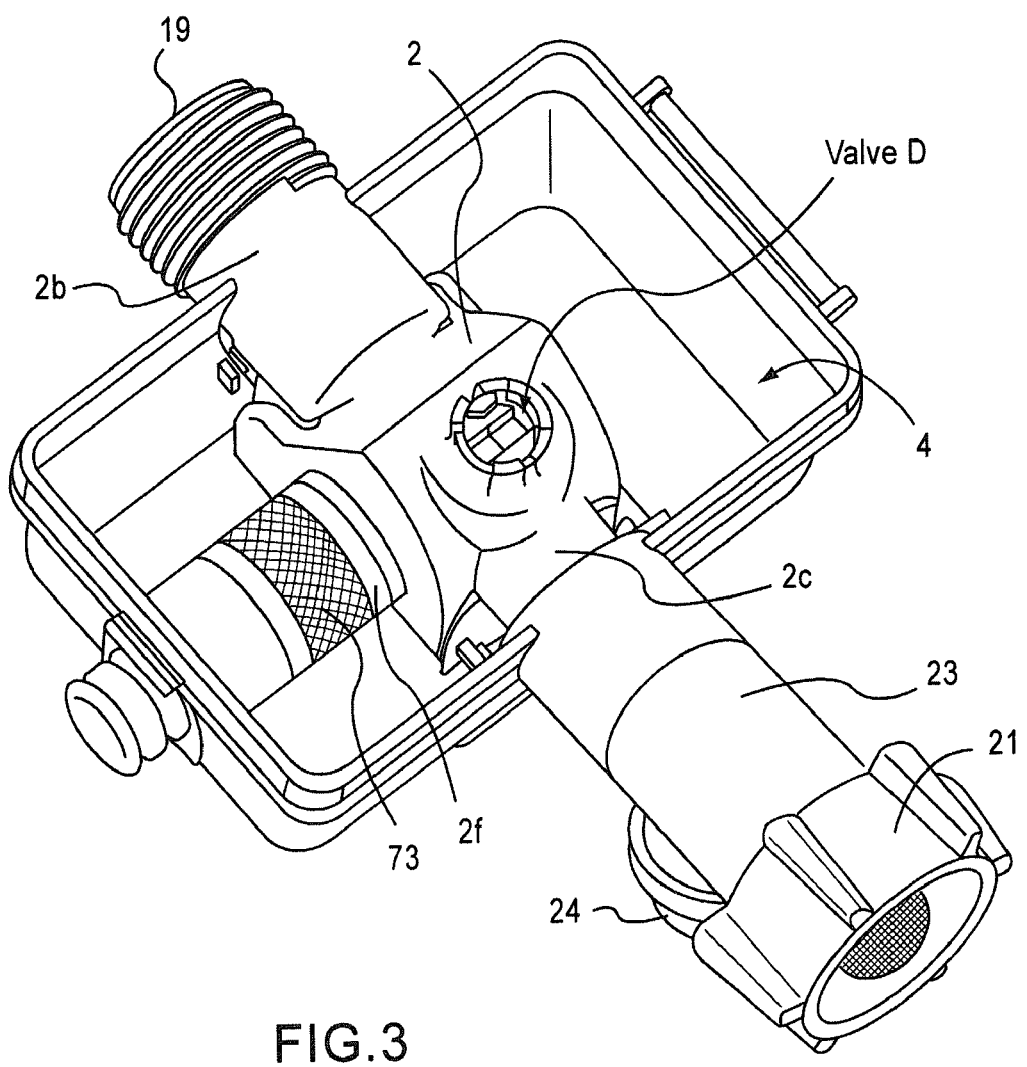
FIG. 3 is top view of the water sensor apparatus with cover removed.
Figure 4:
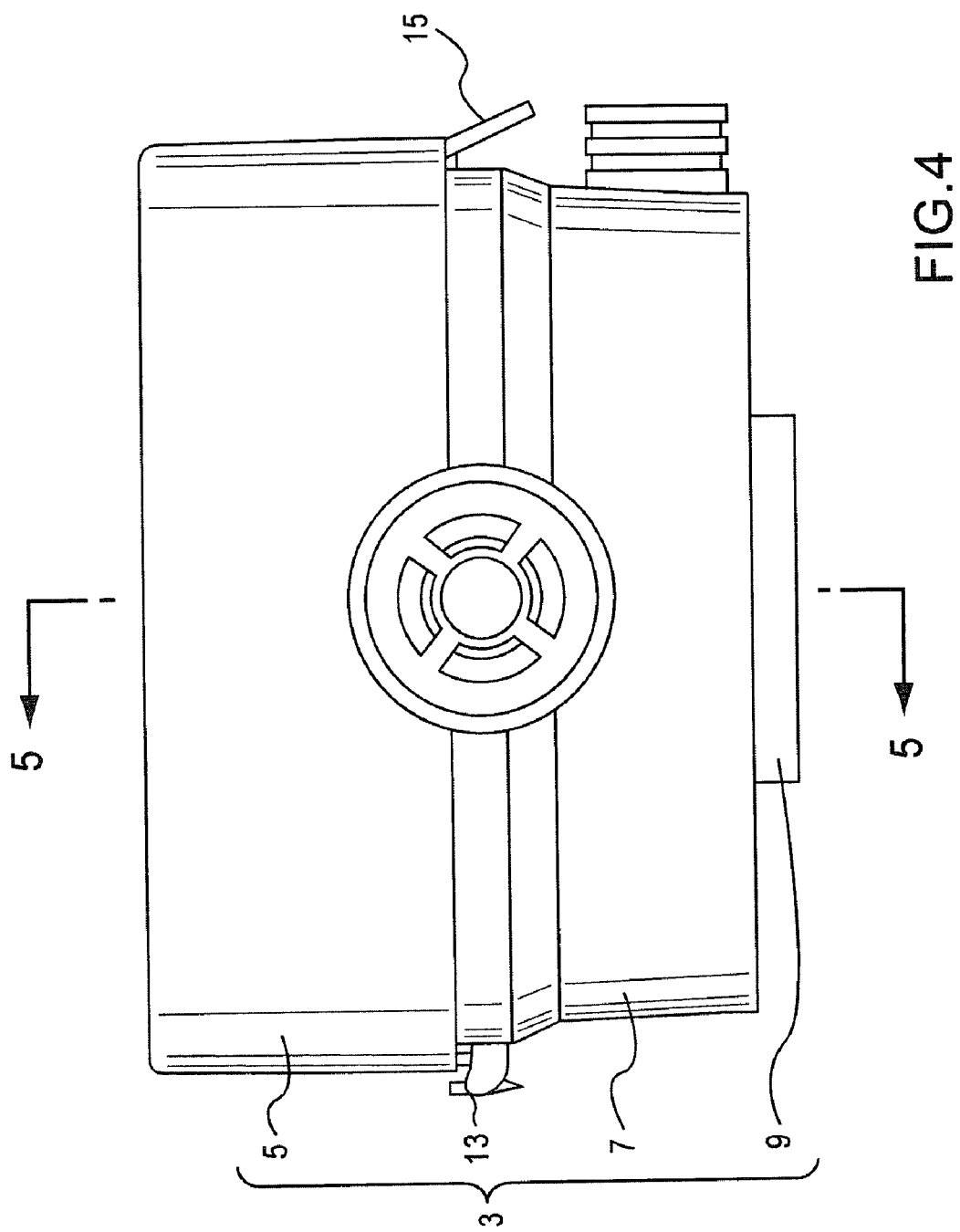
FIG. 4 is side view of the water sensor apparatus.

A perspective view, a top view (with the cover removed), and a side view of one embodiment of the water sensor apparatus 1 are shown in FIGS. 2, 3, and 4, respectively.

Water sensor apparatus 1 includes main housing 3, water inlet chamber 23, and sprinkler adaptor 19.

Main housing 3 comprises cover 5, valve housing 7, and base 9, from top to bottom, respectively. Each of these components are preferably molded of a polymeric material having requisite strength and durability for service under the conditions to be described below. The general shape of main housing 3 is shown in FIGS. 2-4; however, it is understood that main housing 3 may be constructed into another desired geometric shape.

As shown in FIG. 4, cover 5 is connected to a top side of valve housing 7 by a hinge 13 and a locking mechanism 15 (e.g., snap, clip, etc.), both preferably made of a polymeric material. Hinge 13 is a conventional joint structure that constrains the cover 5 and the valve housing 7 in such a way so that they pivot respectively with each other (e.g., any known suitable hinge may be used). Locking mechanism 15 is designed to prevent the cover 5 from unintentionally opening. This structure allows a user to have better access (e.g., for maintenance purposes) to the inside portion of the water sensor apparatus 1. Alternatively, cover 4 and valve housing 7 may be designed without the swingable assembly described above.

As shown in FIG. 2, cover 5 is formed of four sidewalls 11 configured in a rectangular-like shape. Rain filter 17 is attached to cover 5 by suitable means and spans the entire width and length thereof. It is understood that a filter having a different structure than rain filter 17 may be used. Rain filter 17 includes apertures, preferably arranged in a generally grid-like manner, to allow water to pass into valve housing 7 and prevent undesired objects from entering housing 7 (e.g., stones, leaves, etc.). The apertures are positioned an appropriate distance apart from each so that water passes through rain filter 17 and into water collecting chamber 4 (described below) within valve housing 7. Rain filter 17 is preferably provided at a position approximately midway along the height of cover 5 so that sidewalls 11 function as splash guards and redirect water deflecting off solid portions of rain filter 17. However, it is understood that rain filter 17 may be positioned in other suitable locations within cover 5.

As shown in FIGS. 2 and 3, valve housing 7 is configured in a rectangular-like shape (e.g., valve housing 7 is similar in shape, but not necessarily in dimension, to the configuration of cover 5). Valve housing 7 comprises main chamber 2 (shown in FIG. 5) extending laterally from one end (water inlet chamber 23 end) of main housing 3 to the other end of main housing 3 (sprinkler adaptor 19 end) and water collection chamber 4 provided adjacent to main chamber 2. In one embodiment (shown in FIG. 3) water collection chamber 4 communicates with main chamber 2 via water filter 73 (e.g., provided in a lower side portion 2f of the main chamber 2). In an unassembled state, the top and bottom of valve housing 7 is open. Valve housing 7 is configured to house valves A, B, C, D, E, and F (described in detail below). Valves A-F are accommodated within main chamber 2. Each of these valves is discussed in detail below with reference to FIGS. 5 and 6.

Base 9 is secured to a bottom side of valve housing 7 by conventional means. In one embodiment, base 9 is secured by ultrasonic weld. In one embodiment, projection element 75 is provided on the top surface of base 9 (e.g., either integrally formed or separately attached) to elevate valve A (discussed below) off base 9 when valve A is in its normal position.

Water inlet chamber 23 is connected to valve housing 7 and facilitates attachment, via coupling nut 19, of hose 150 to water sensor apparatus 1. Sprinkler adaptor 19 is connected to an opposing side of valve housing 7 and facilitates attachment of a sprinkler 300 to water sensor apparatus 1.

Figure 5:
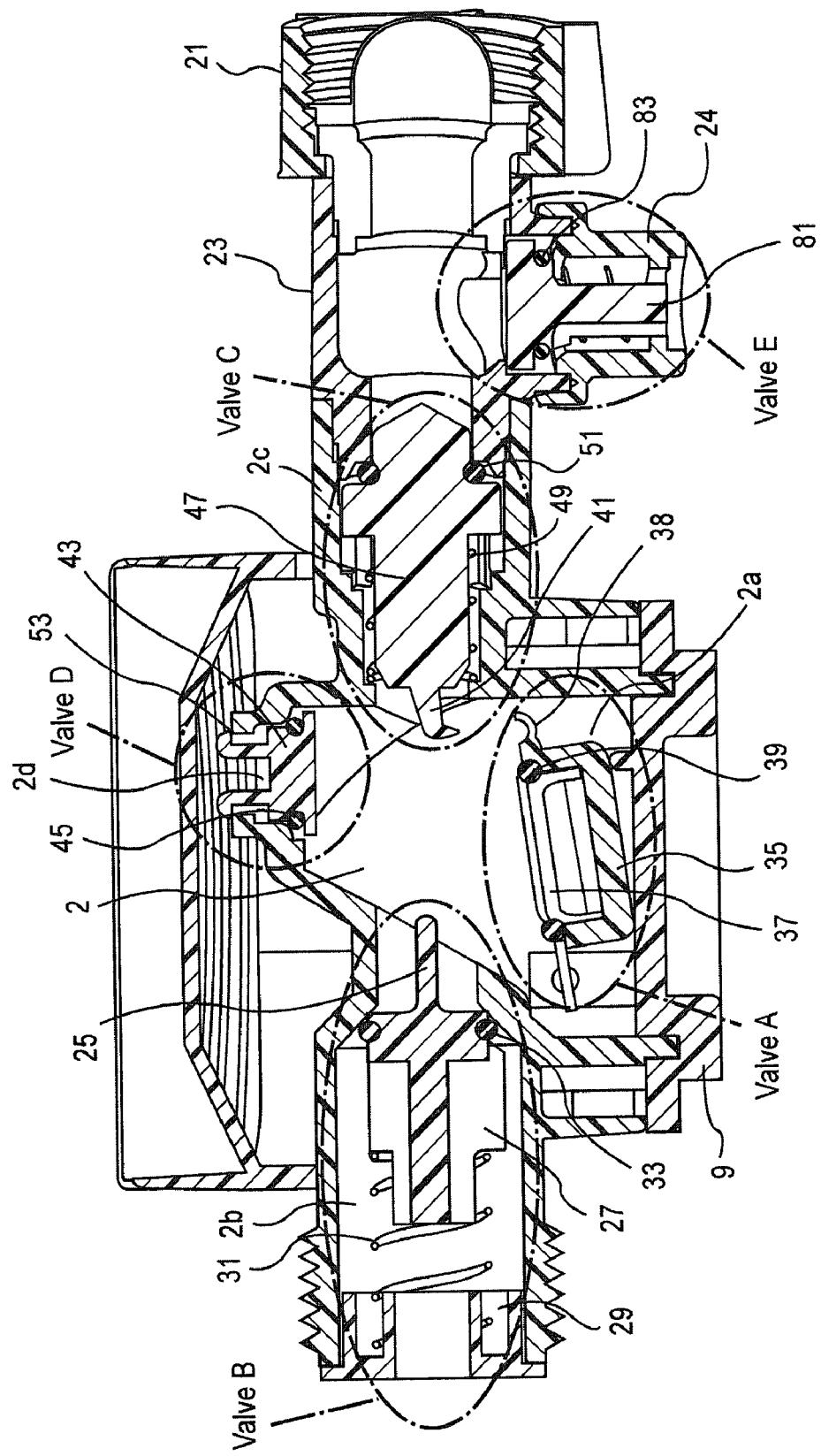
FIG. 5 is a cross-sectional view of the water sensor apparatus along lines 5-5 of FIG. 4.
Figure 6:
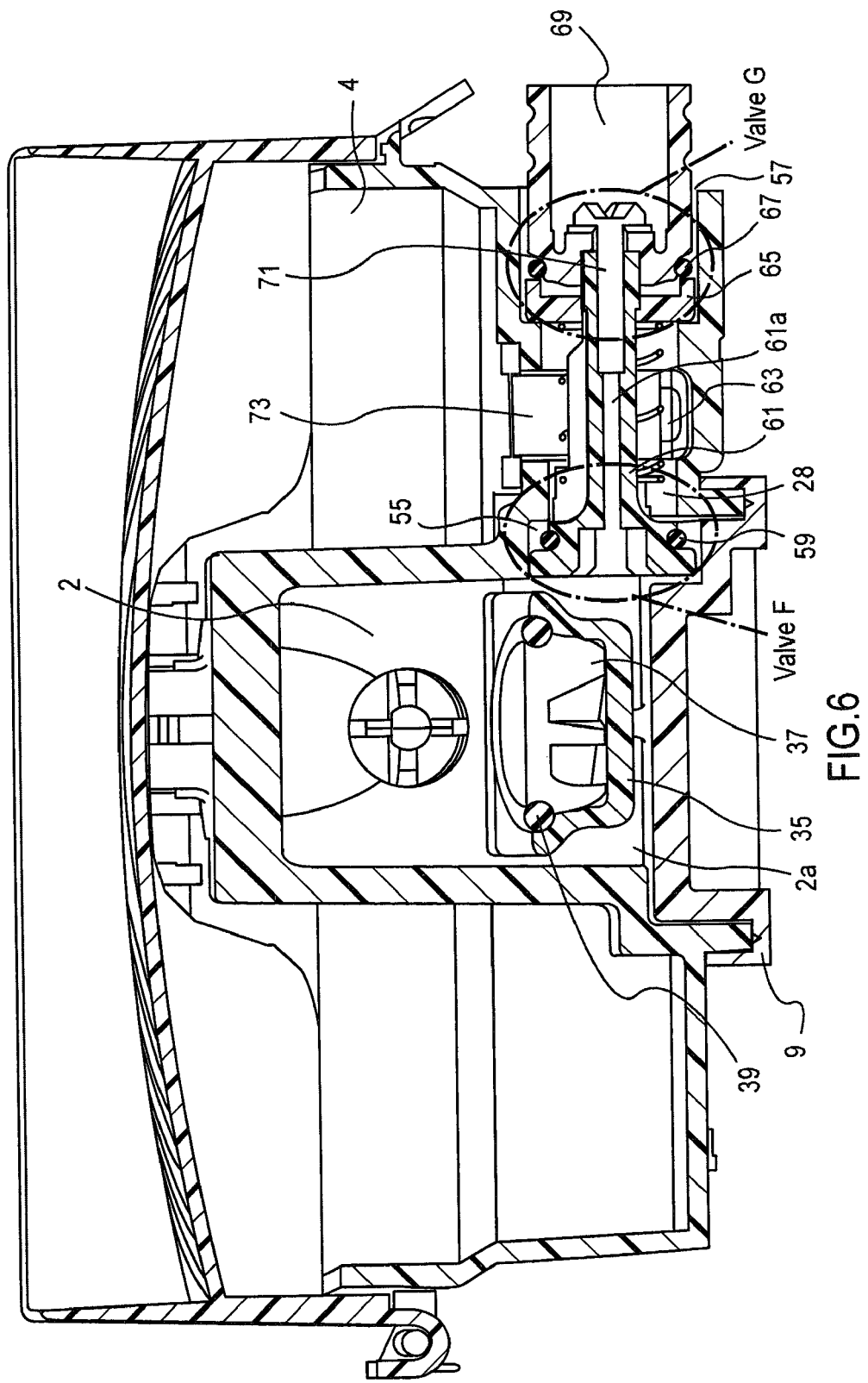
FIG. 6 is a cross-sectional view of the water sensor apparatus along lines 6-6 of FIG. 2.

Turning now to FIG. 5 and FIG. 6, the water sensor apparatus 1 will be described in detail.

FIG. 5 is a cross-sectional view of water sensor apparatus 1 taken along lines 5-5 shown in FIG. 4. In particular, FIG. 5 shows a cross-sectional view of valves A, B, C, D, and E, each of which are circled in FIG. 5 and described in detail below.

As shown in FIG. 5, valve A (e.g., float valve A) is accommodated in a lower portion 2a of main chamber 2 (e.g., valve body) and comprises a disk 35, disk cover 37, and seal 39, preferably an elastomeric o-ring seal. In FIG. 5, valve B is open (e.g., there is less than a predetermined amount of water collected in main chamber 2). In FIG. 5, disk 35 is attached to disk cover 37 (e.g., ultrasonically welded). Disk 35, disk cover 37, and seal 39 form a subassembly. Disk cover 37 is configured in a u-like shape. One end portion of disk cover 37 (e.g., open end portion of u-like shape) is pivotally coupled to an upper surface of base 9. The other end portion of disk cover 37 may include a hook-like structure 38 for reasons to be discussed below. In general terms, disk 35 is a buoyant member (e.g., such as hollow canister) adapted to move in a general vertical direction in response to a rising water level within main chamber 2, for shifting valve A from an open position to a closed position, in a manner to be described in more detail below. A bottom portion of disk 35 rests on projection element 75 when there is little or no water in main chamber 2. The combination of disk 35, disk cover 37, and seal 39 floats upward as the water level in main chamber 2 increases. In general terms, when the end of disk cover 37 is higher than an end of inlet block 47 (valve C) and water timer 200 is on, the high pressure water entering main chamber 2 from water inlet chamber 23 will force disk 35 against valve seat A, which is formed on the inside surface of valve housing 7, and effectively shut the valve and stop fluid flow (e.g., FIGS. 10a and 10b). Seal 39 is configured to prevent high pressure water from flowing around disk 35 and downstream into sprinkler 300. The operation of valve A under various operating conditions will be discussed in more detail below.

Valve B is accommodated in an outlet side portion 2b of main chamber 2 of valve housing 7 and comprises outlet block 27 (valve body), spring 31, and seal 33, preferably an elastomeric o-ring seal. In FIG. 5, valve B is closed (e.g., there is no high pressure water entering the main housing 3 from water inlet chamber 23). As shown in FIG. 4, both lateral sides of outlet side portion 2b of main chamber 2 are open to allow high pressure fluid to flow from the inlet side to the sprinkler side of water sensor apparatus 1 when valve A is open (i.e., water collected at bottom of chamber is less than a predetermined threshold) and the water timer is on. Outlet block 27, spring 31, and seal 33 are accommodated in outlet side portion 2b. Spring 31 is connected at one end to spring holder 29 and the other end to outlet block 27. The general shape of outlet side portion 2b is shown in FIG. 4; however, it is understood that outlet side portion 2b may be constructed into another desired geometric shape. As shown in the embodiment illustrated in FIG. 4, outlet side portion 2b comprises a first section and a second section, wherein the first section has a larger internal diameter than the second section. Outlet block 27 is configured to have a push portion 25 protruding from one end of main body portion of outlet block 27 and towards main chamber 2. Push portion 25 has a smaller outer diameter than the main body portion of outlet block 27. Outlet block 27 is maintained in a closed position by the force exerted thereon by spring 31.

In the closed position, valve B blocks residual water inside the sprinkler device or hose from re-entering main chamber 2 (e.g., when the water time is turned off). Valve B opens the water channel (e.g., outlet side portion 2b) when the water pressure entering outlet side portion 2b is greater than the opposing spring force exerted on outlet spring 27. When valve B transitions from an open to a closed position (e.g., after sprinkling operation is completed and timer is turned off), push portion 25 contacts disk 35 (of valve A), thereby returning disk 35 to its open or resting position (e.g., when there is no water in main chamber 2).

Valve C (inlet stem valve) is accommodated in an inlet side portion 2c of main chamber 2 of valve housing 7 and comprises inlet block 47 (valve body), spring 49, and seal 51, preferably an elastomeric o-ring seal. In FIG. 5, valve C is closed (e.g., there is no high pressure water entering water inlet chamber 23 from hose 150). Inlet block 47 includes a blocking portion 41 protruding from one end thereof and extending into main chamber 2. Blocking portion 41 may be configured, as shown, in the shape of a downward hook in order to enhance engagement with valve A (described above). Inlet block 47 is maintained in its closed position by a force exerted thereon by spring 49. One portion of inlet side portion 2c is configured to be a valve seat C. Seal 51 is provided between inlet block 47 and valve seat C of inlet chamber 23 in order to seal inlet side portion 2c from water when the timer is turned off. Inlet block 47 moves in a lateral direction, alternatively permitting water to flow from water inlet chamber 23 to main chamber 2 and stopping water from flowing from main chamber 2 to water inlet chamber 23. In particular, when high pressure water enters inlet side portion 2c from hose 150, the pressure exerted against inlet block 47 opens valve C (e.g., water pressure is greater than the opposing spring force). In one embodiment, 5-6 PSI (pounds per square inch) of pressure is necessary to open valve C. In general terms, inlet block 47 moves approximately 0.125" (with a maximum travel distance of 0.650") in the lateral direction and opens valve C, which creates a conduit for the high pressure water to pass through. Inlet block 47 is configured to prevent residual water inside the hose (not illustrated) from entering main chamber 2 of valve housing 3 when the timer is off. Inlet block 47 may also taper into a cone-like shape at the end opposite the main chamber 2 in order to direct water through (e.g., around inlet block 2) inlet side portion 2c and into main chamber 2.

As shown in FIG. 5, valve housing 7 is configured to enable high pressure water to pass from inlet side portion 2c (e.g., housing valve C) to outlet side portion 2b (e.g., housing valve B). Inlet side portion 2c and outlet side portion 2b are arranged on substantially the same horizontal plane so that, when valves A, B, and C are open (e.g., collected water is less than a predetermined threshold and water timer is on), the flow path of high pressure water is not restricted. In one embodiment, this horizontal plane is arranged at approximately the midpoint of main housing 3.

Valve D (overhead valve) is accommodated in an upper portion 2d of main chamber 2 and comprises valve body 43, and seal 45, which is preferably an elastomeric o-ring seal. In FIG. 5, valve D is open (e.g., low pressure in chamber 2). Upper portion 2d of main chamber 2 defines valve seat D and aperture 53 for introducing air pressure into main chamber 2 of valve housing 7. Valve body 43 travels a defined distance in the vertical direction in response to the pressure level inside main housing 2, thereby closing valve D by seating valve body 43 against valve seat D. Seal 45 is provided between valve body 43 and valve seat D and is designed to prevent air from leaking into main chamber 2 when valve D is closed. In operation, valve body 43 opens (e.g., moves downward by its own weight away from valve seat D) to introduce air pressure into main chamber 2 via aperture 53 when the pressure within main chamber 2 is below a predetermined threshold (e.g., atmospheric pressure, 15 PSI). Alternatively, valve D closes when the pressure within main chamber 2 is above the predetermined threshold. Valve body 43 is attached by conventional means (e.g., snap, adhesive) to the upper portion 2d of main chamber 2.

Valve E (relief valve) is provided in relief conduit 24. Relief conduit 24 communicates with an inside portion of water inlet chamber 23 and extends in a downward direction. Relief conduit 24 may be constructed integral with or assembled to inlet chamber 23. Valve E comprises valve body 81, seal 83, and spring 85, which is preferably an elastomeric o-ring seal. Relief conduit 24 is configured to define a valve seat E. Spring 85 is attached to valve body 81. In FIG. 5, valve E is open (e.g., there is no high pressure water entering water inlet chamber 23 from hose 150). Valve body 81 travels a designed distance in a generally vertical direction in response to the pressure level inside water inlet chamber 23. Spring 85 applies an appropriate spring force to valve body 81 to bias valve body 81 in an upward position (e.g., not in contact with valve seat E) when the water pressure within water inlet chamber 23 is less than a predetermined threshold (e.g., in one embodiment, the threshold is set to 5 PSI). Accordingly, valve E is designed so that any residual water located in water inlet chamber 23 will pass through open valve E and exit water sensor apparatus 1 via relief conduit 24. Alternatively, if the water pressure inside water inlet chamber 23 is greater than the predetermined threshold (e.g., 5 PSI), then valve E is designed to close. In operation, when a force applied to valve body 81 (by the water pressure) exceeds an opposing spring force applied thereto by spring 85, valve body 81 is pressed against valve seat E. Seal 83 is provided between valve body 81 and valve seat E and is designed to prevent water from leaking into relief conduit 24 when valve E is closed.

FIG. 6 is a cross-sectional view of water sensor apparatus 1 taken along lines 6-6 shown in FIG. 2. In particular, FIG. 6 shows a cross-sectional view of valves F and G, each of which will be described in detail.

Figure 23:
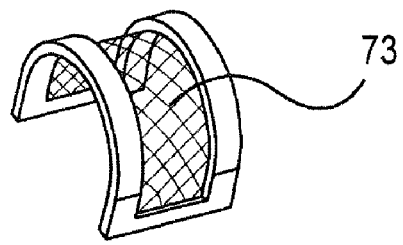
FIG. 23 is a view of water filter 73.

Valve F (drain valve) is provided in a lower side portion 2f of main chamber 2 of valve housing 7. As shown in FIG. 5, lower side portion 2f is arranged on a horizontal plane below valves B and C (described above). Both lateral ends of the lower side portion 2f of main chamber 2 are open. A first end of lower side portion 2f opens to main chamber 2 and a second end extends away from main housing 3 (e.g., drains water to external environment). Valve F comprises seal 59 (e.g., preferably an elastomeric o-ring seal), valve body 61 (e.g., stop stick), spring 63, and drain ring 65. Water collecting chamber 4 is located above lower side portion 2f of main chamber 2 and is capable of communicating fluidly with main chamber 2 via water filter 73 provided on lower side portion 2f. One embodiment of water filter 73 is shown in FIG. 23. Lower side portion 2f is configured to define valve seat F. Spring 63 is attached to valve body 61 and drain ring 65. Valve body 61 includes horizontal through-hole 61a, which is a channel extending lengthwise across valve body 61. The function of through-hole 61a will be described below. Valve body 61 travels a predetermined distance in a lateral direction in response to water pressure inside main chamber 2 of valve housing 7.

In operation, when the water timer is off, spring 63 applies an appropriate spring force to valve body 61 to bias valve body 61 away from valve seat F, thus creating opening 55 between valve seat F and valve body 61 for water inside the water collecting chamber 4 to pass into main chamber 2 of valve housing 7 (e.g., to thereby activate valve A). Valve F is designed to close when the water pressure inside main chamber 2 is greater than the spring force applied to valve body 61 by spring 85. In particular, valve F closes when valve body 61 presses against valve seat F, creating a seal between main chamber 2 and lower side portion 2f.

Figure 22:
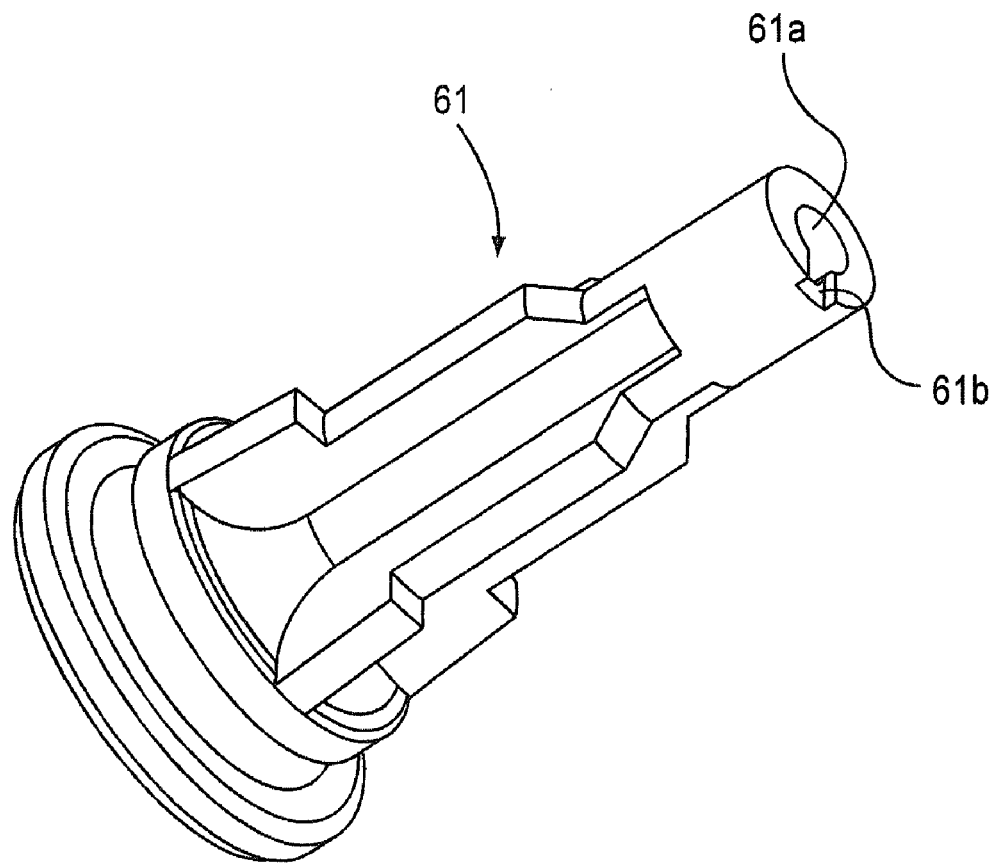
FIG. 22 is a view of valve body 61.

As shown in FIG. 6, valve body 61 is attached to knob 69 via fastener 71. Valve F is designed to leak high pressure water from main chamber 2 to an outside environment (when valve F is closed), via valve body 61 and opening 70. In one embodiment, valve body 61 is configured to comprise through-hole 61a and drain path 61b. Through-hole 61a extends longitudinally from one end of valve body 61 (exposed to main chamber 2) to the other end of valve body 61 (exposed to knob 69). Drain path 61b communicates with the portion of through-hole 61a on the knob side of valve body 61. In one embodiment, as shown in FIG. 22, drain path 61 is formed by removing a notch-like portion of valve body 61 adjacent to through-hole 61a on the knob side of valve body 61. In operation, high pressure water enters through-hole 61a when valve F is closed and exits water sensor apparatus 1 at opening 70, downstream from the conduit defined by through-hole 61a and drain path 61b. As shown in FIG. 5, opening 70 is provided on a bottom surface of the lower side portion 2f of main chamber 2. In FIG. 5, opening 70 is provided beneath fastener 71. However, it is understood that opening 70 may be positioned in other suitable locations within lower side portion 2f of main chamber 2 of valve housing 7.

Valve G (shutoff valve) is provided in lower side portion 2f of main chamber 2 of valve housing 7. Valve H shares components with Valves F and G. Valve G comprises valve body 61, seal 67 (e.g., preferably an elastomeric o-ring seal), fastener 71, drain ring 65, and knob 69 (e.g., valve body). As described above, valve body 61 is attached to knob 69 via fastener 71. Drain ring 65, provided between knob 69 and valve body 61, is attached to an inside surface of the lower side portion 2f of main chamber 2 (e.g., press fit). Knob 69 travels a predetermined distance in the lateral direction to and from drain ring 65 in response to water pressure inside main chamber 2 of valve housing 7. In operation, when the water timer is off, knob 69 presses against drain ring 65 (e.g., valve seat G), thereby sealing opening 70 and preventing water from inside water collection chamber 4 from leaking to the outside of water sensor apparatus 1. Alternatively, when the water timer is on, high pressure water inside main chamber 2 laterally displaces knob 69 away from drain ring, thereby allowing water from inside the water collection chamber 4 to drain to the outside of water sensor apparatus 1. As described in further detail below, when valve F is open (e.g., spring 63 applies an appropriate spring force to displace valve body 61 away from valve seat F), valve G is shut.

In addition, the knob 69 can be pulled outward (e.g., away from the water sensor apparatus) to manually remove water collected in the main chamber 2.

As described above, water sensor apparatus 1 is a component of a watering system (FIG. 1) that further comprises a water source 100, water timer 200 and sprinkler device 300. Water sensor apparatus 1 is designed to prevent the water timer from supplying water to the sprinkler device when more than a predetermined level of water has collected in main chamber 2 of sensor apparatus 1. In general terms, valves A-F, described above, open and close in response to the presence or absence of (a) high pressure water entering water sensor apparatus 1 from the inlet side when water timer 200 is on, (b) a predetermined level of rain water collected in main chamber 2, and (c) high pressure water collected in main chamber 2.

FIGS. 7A-11B illustrates how valves A-G of the water sensor apparatus 1 operate under the following conditions:

I. Water timer is off and the water collected in main chamber 2 is less than a desired amount, e.g., 0.50";
II. Water timer is on and the water collected in main chamber 2 is less than a desired amount, e.g., 0.50";
III. Water timer is off and the water collected in main chamber 2 is greater than a desired amount, e.g., 0.50"; and
IV. Water timer is on and the water collected in main chamber 2 is greater than a desired amount, e.g., 0.50".

It is generally understood that sensor apparatus 1 could be configured to operate under different conditions (e.g., threshold greater or less than 0.50" of collected rainfall) and not deviate from the spirit and scope of this invention.

Condition I.

Figure 7A:
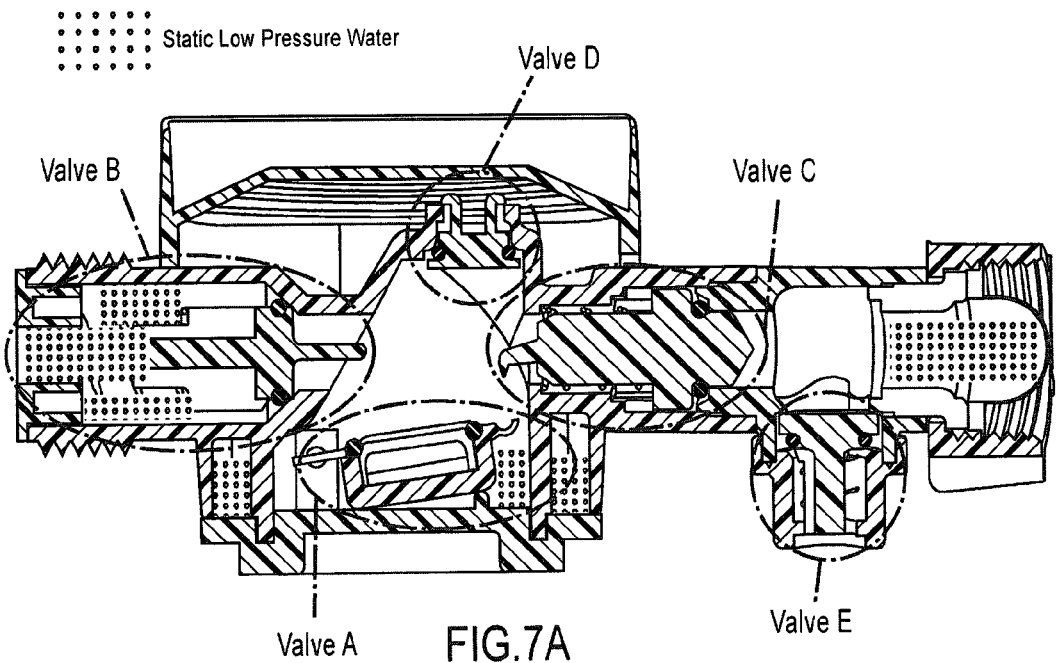
FIG. 7A is a cross-sectional view, under condition I, of the water sensor apparatus along lines 5-5 of FIG. 4.
Figure 7B:
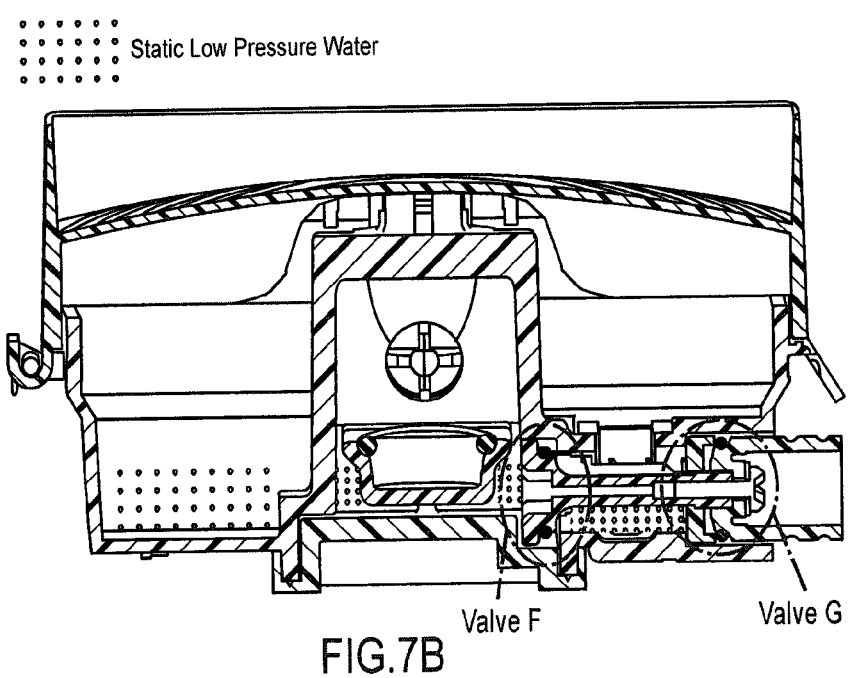
FIG. 7B is a cross-sectional view, under condition I, of the water sensor apparatus along lines 6-6 of FIG. 3.

FIGS. 7A and 7B illustrate sectional views 6-6 and 5-5 of sensor apparatus 1, respectively, under condition I (i.e., collected rain fall <0.50" and the water timer is "off"). This condition arises between watering cycles when there has been little or no rainfall.

Figure 16:
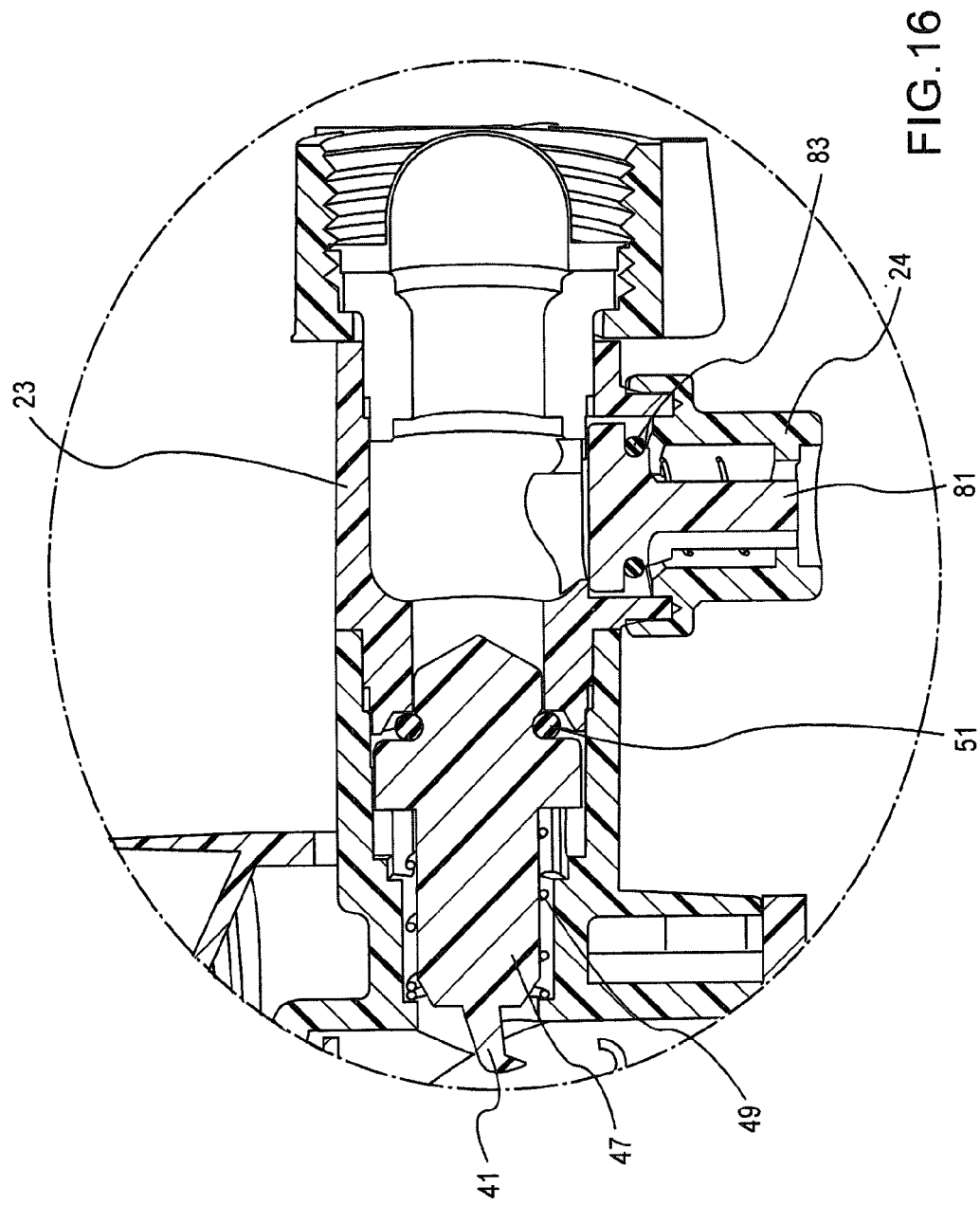
FIG. 16 is a partial cross-sectional view of valves C and E under conditions I and III.

In general terms, when the water timer is "off" (i.e., no incoming high pressure water), valve C is closed. FIG. 16 shows a partial cross-sectional view of valve C under condition I (e.g., spring force biases inlet block 47 away from the main chamber 2). Blocking portion 41 of inlet block 47 does not interfere with the vertical pivot axis of float body A (e.g., disk 35) when valve C is closed. The vertical position of float body A (about the vertical pivot axis described above of float body A) is determined, in part, by the water level accumulated in main chamber 2. In other words, as the water level rises, so does float body A. However, under condition I (i.e., collected rain fall <0.50"), float body A does not rise to a point where inlet block 47 would interfere with the vertical pivot axis of float body A (e.g., disk 35) when valve C is open.

Valve B is closed to prevent static low pressure water present in sprinkler 300 and sprinkler adaptor 19 from flowing back into main chamber 2. FIG. 12 shows a partial cross-sectional view of valve B under condition I (e.g., outlet block 27 is seated against valve seat B in outlet side portion 2b of main chamber 2).

Valve E is open (e.g., valve body 81 is biased away from valve seat E) in order to drain static low pressure water present in hose 150 or inlet chamber 23 so that such low pressure water does not flow into main chamber 2.

Figure 20:
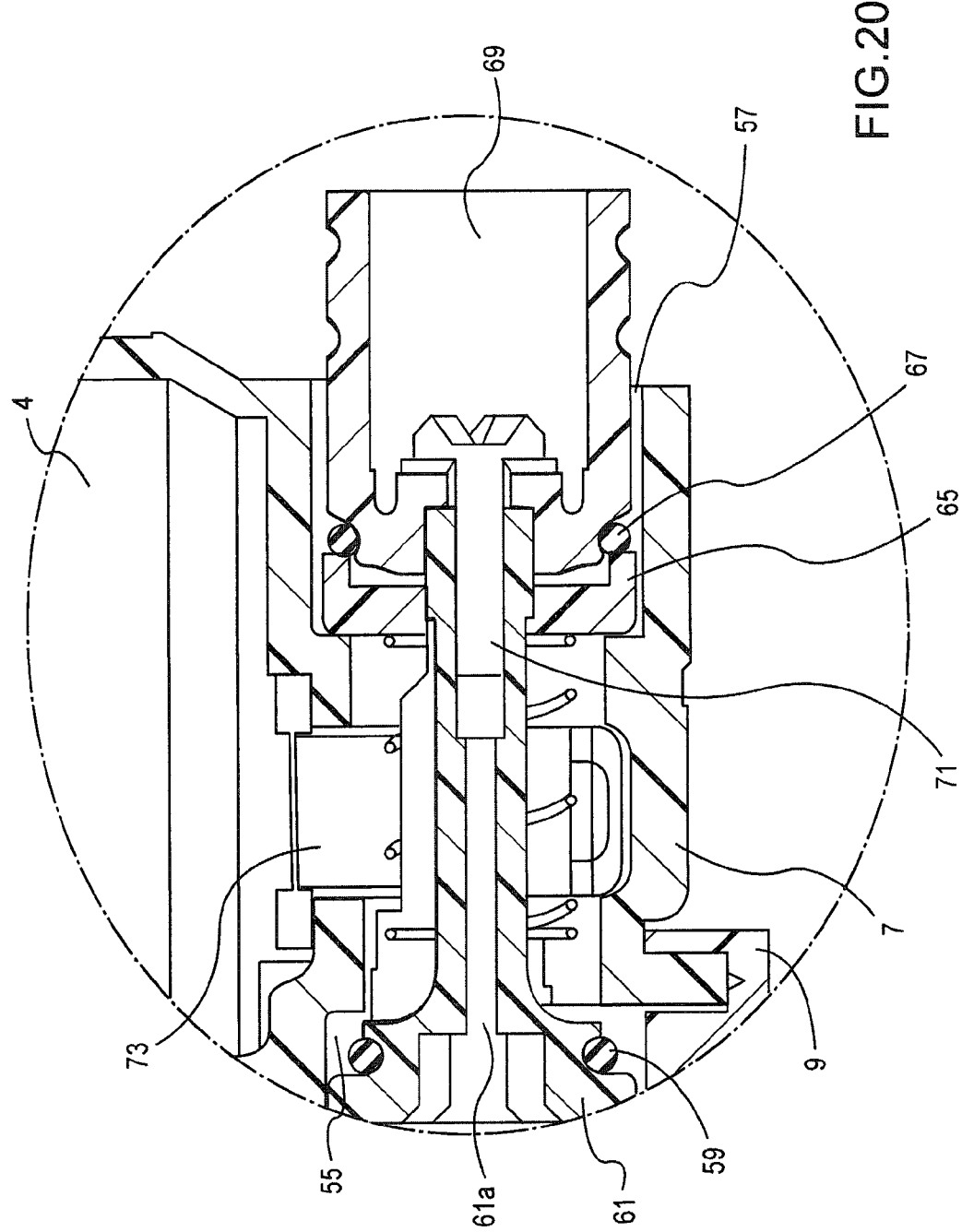
FIG. 20 is a partial cross-sectional view of valves F and G under conditions I and III.

Valve F is open in order to create opening 55 in lower side portion 2F of main chamber 2 for rain water collected in collection chamber 4 to pass through (and thereby active valve A). FIG. 20 shows a partial cross-sectional view of valve F under condition I (e.g., valve body 61 is biased away from seat valve F).

Valve G is closed in order to prevent the rain water collected in collection chamber 4 from passing through opening 57 instead of 55 when the timer is off. FIG. 20 shows a partial cross-sectional view of valve G under condition I (e.g., valve body 69 seals drain opening 57).

Valve D is open because the pressure within chamber 2 is less than atmospheric pressure.

Next, we will describe what happens when the water timer 200 turns "on" under the rain water conditions described above.

Condition II.

Figure 8A:
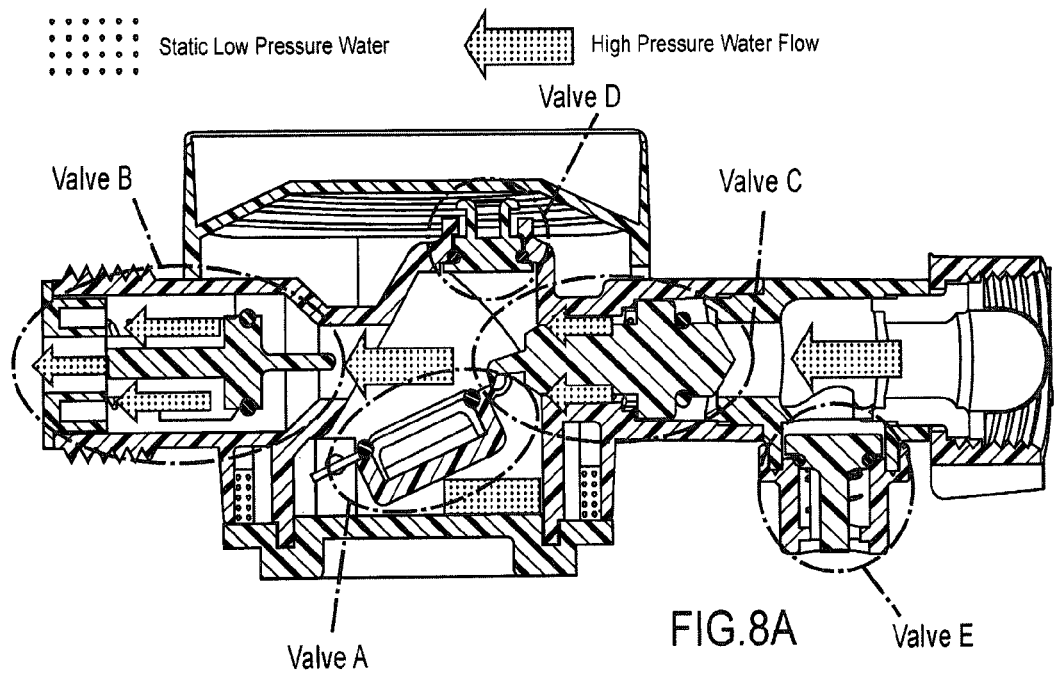
FIG. 8A is a cross-sectional view, under condition II, of the water sensor apparatus along lines 5-5 of FIG. 4.
Figure 8B:
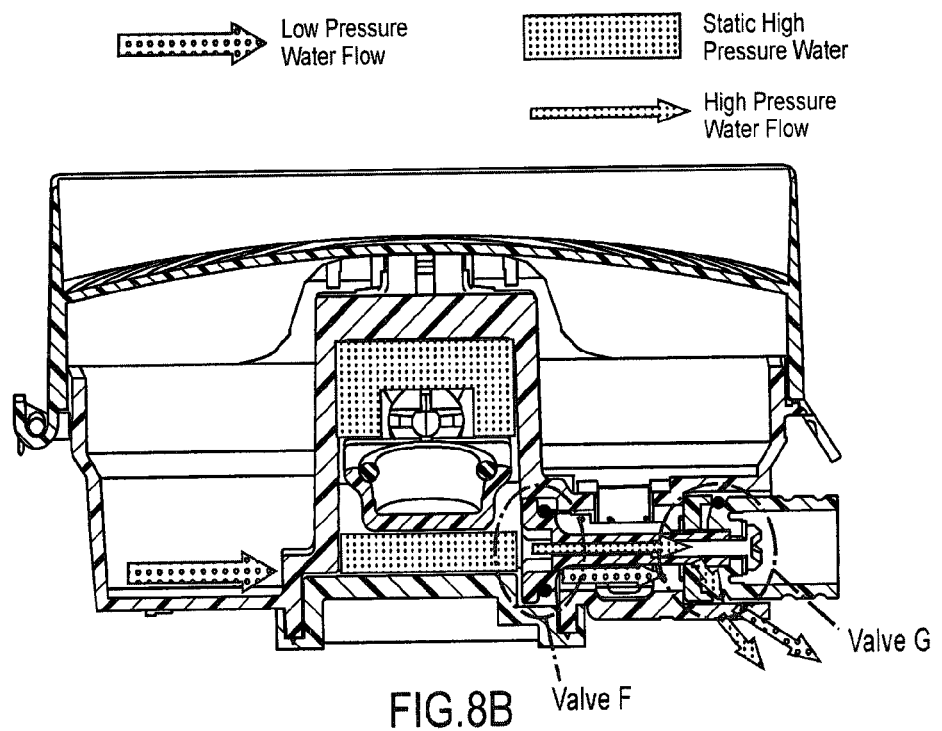
FIG. 8B is a cross-sectional view, under condition II, of the water sensor apparatus along lines 6-6 of FIG. 3.

FIGS. 8A and 8B illustrate sectional views 6-6 and 5-5 of sensor apparatus 1, respectively, under condition II (i.e., collected rain fall <0.50" and the water timer is "on"). This condition arises when the water timer turns on after a period of little or no rainfall.

Figure 17:
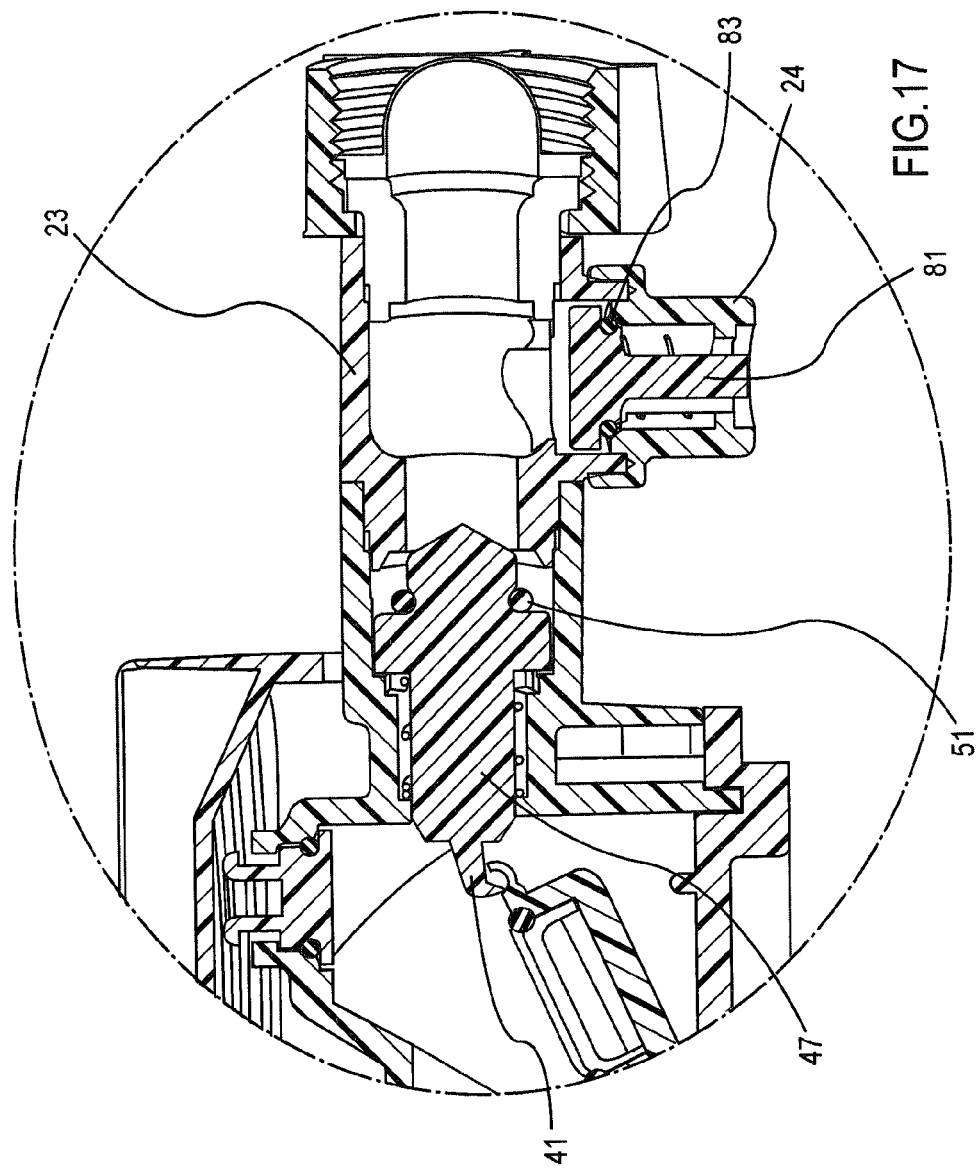
FIG. 17 is a partial cross-sectional view of valves C and E under conditions II and IV.
Figure 18:
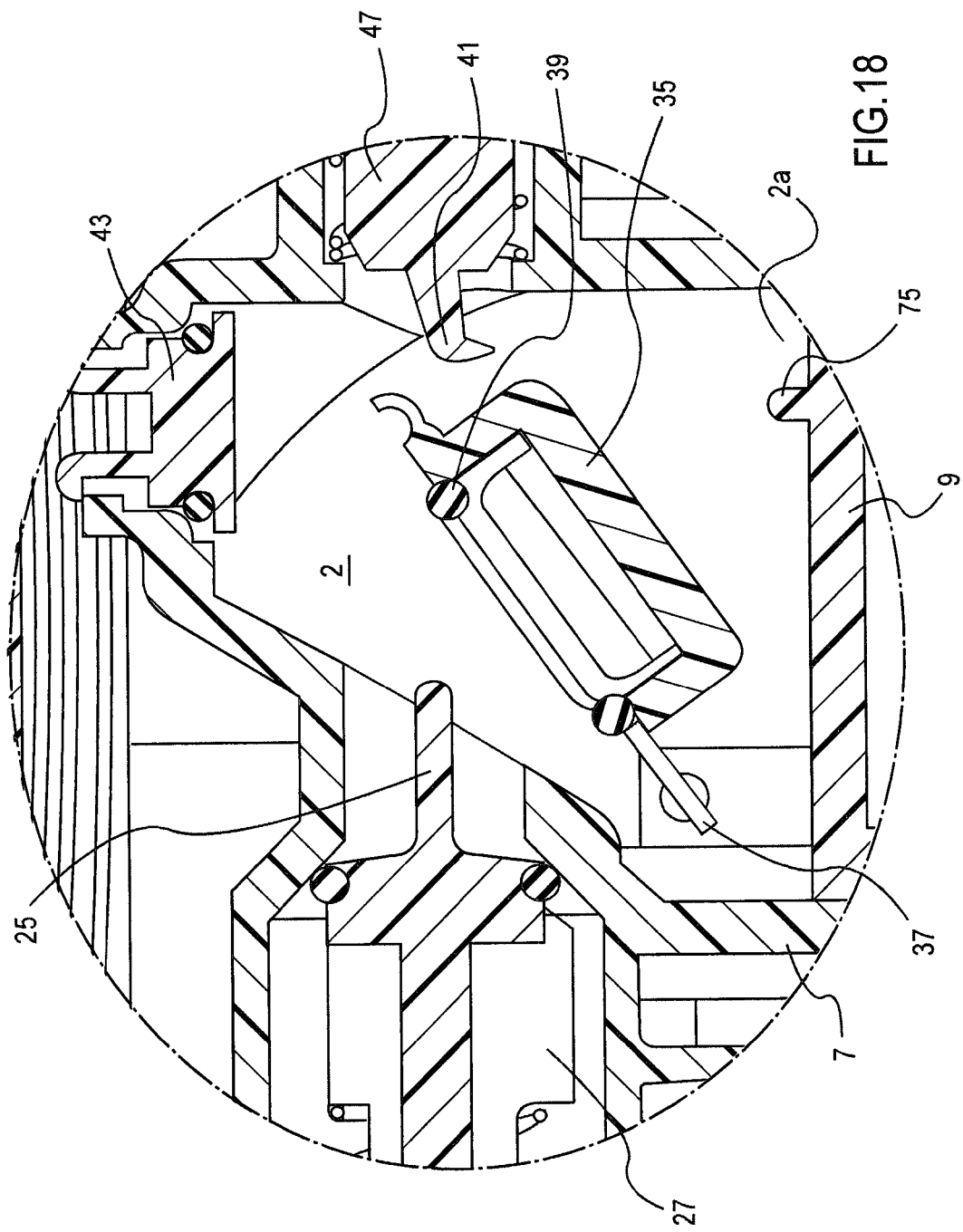
FIG. 18 is a partial cross-sectional view of valve A under condition III.

In general terms, when the water timer is on, high pressure water (e.g., >5 PSI) enters water inlet chamber 23 via hose 150. Under this condition, valve C opens and valve E closes due to the force exerted against inlet block 47 and valve body 81 by the incoming high pressure water, respectively (e.g., overcomes the opposing spring force in valves C and F). Due to the opening of valve C, blocking portion 47 is displaced in the horizontal direction a predetermined amount so that it interferes with the pivot axis of float body A and prevents valve A from closing during the watering cycle. FIG. 17 shows a partial cross-sectional view of valves C and E under condition II.

Figure 13:
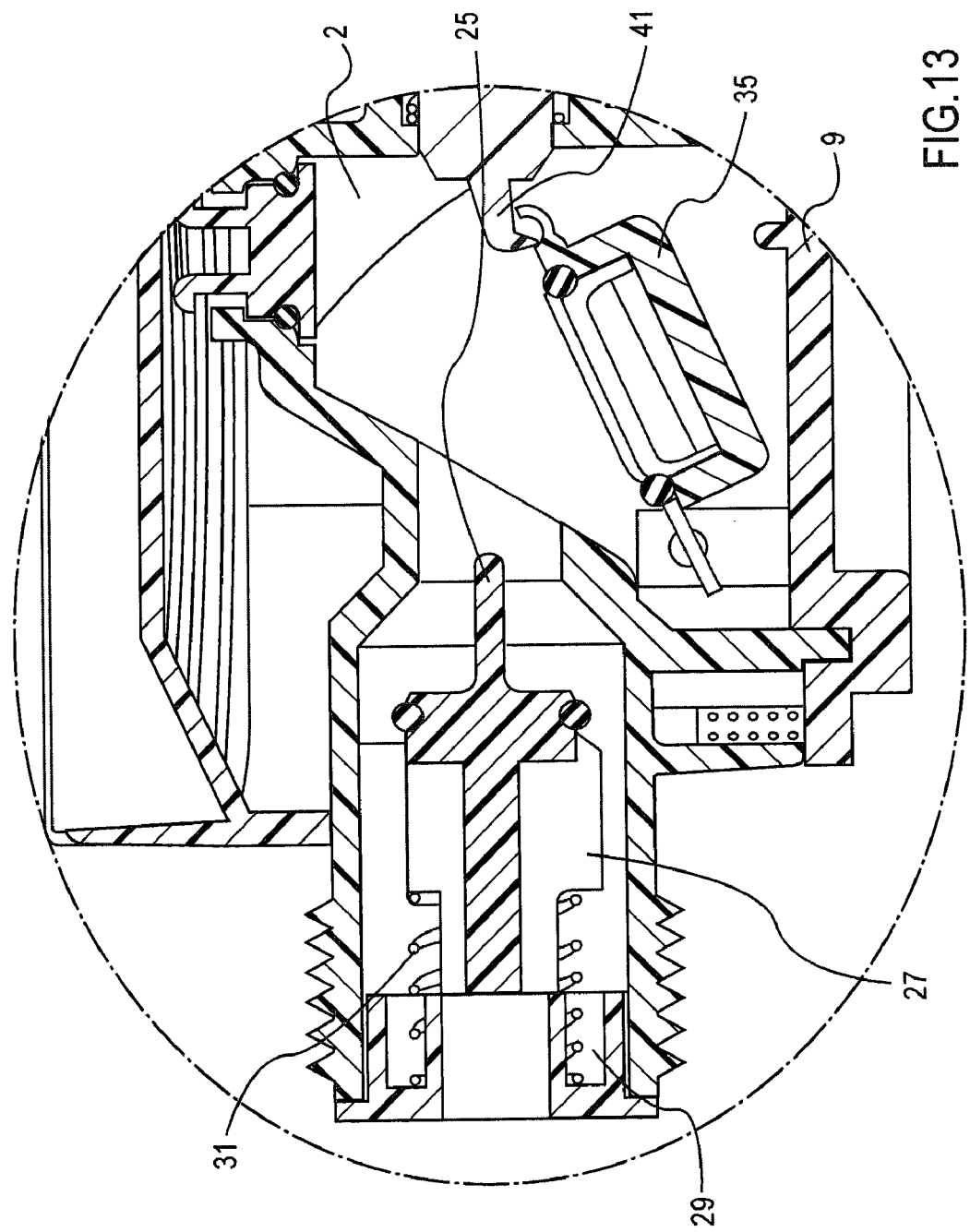
FIG. 13 is a partial cross-sectional view of valve B under condition II.

Under this condition, valve B opens due to the force exerted against outlet block 27 by the incoming high pressure water (e.g., overcomes the opposing spring force acting on outlet block 27), thereby creating a pathway to sprinkler 300 for the high pressure water to flow. FIG. 13 shows a partial cross-sectional view of valve B under condition II.

Figure 15:
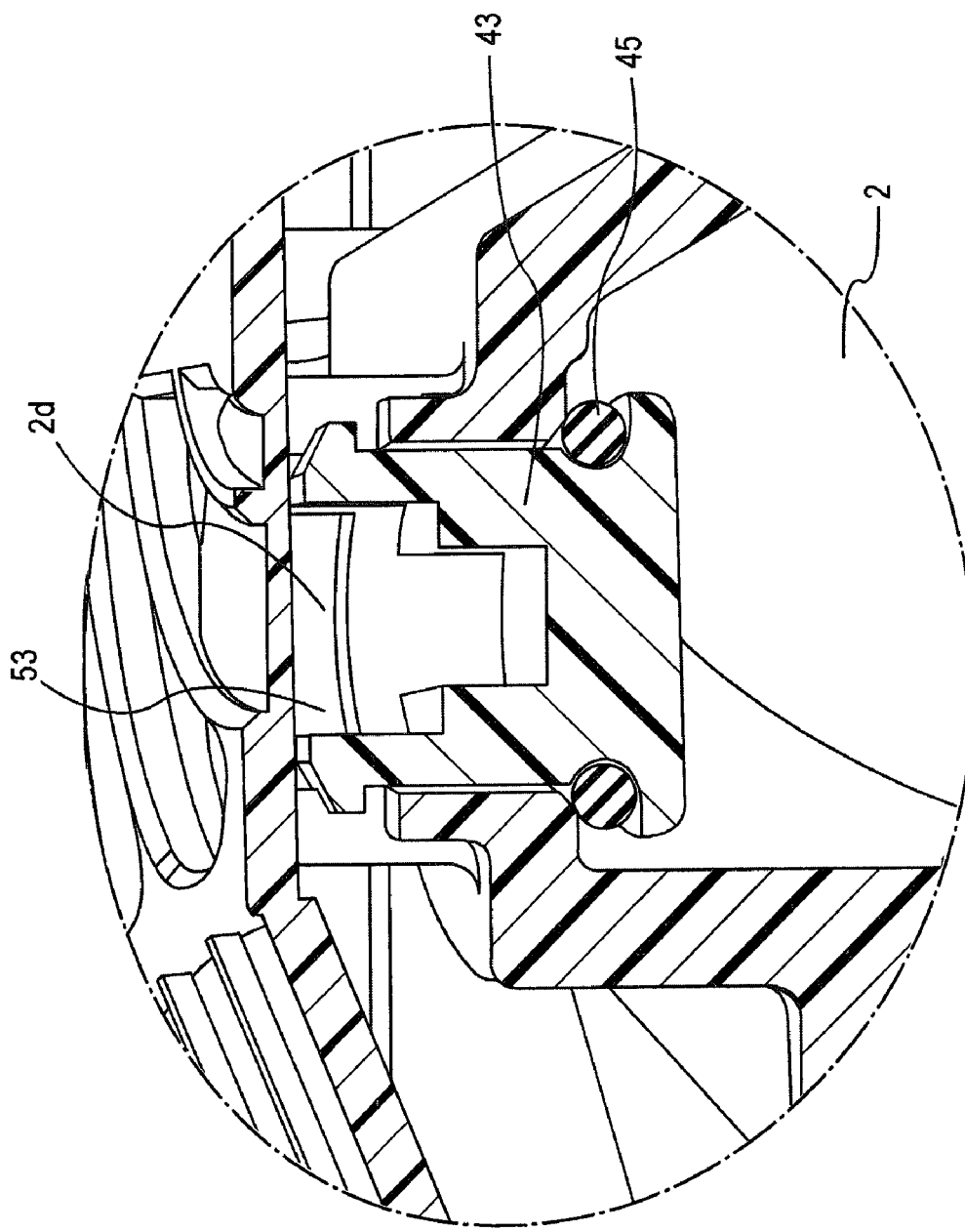
FIG. 15 is a partial cross-sectional view of valve D under conditions I and II.

Valve D closes because the pressure within chamber 2 is greater than atmospheric pressure. FIG. 15 shows a partial cross-sectional view of valve D under condition II (e.g., creating opening 53).

Figure 21:
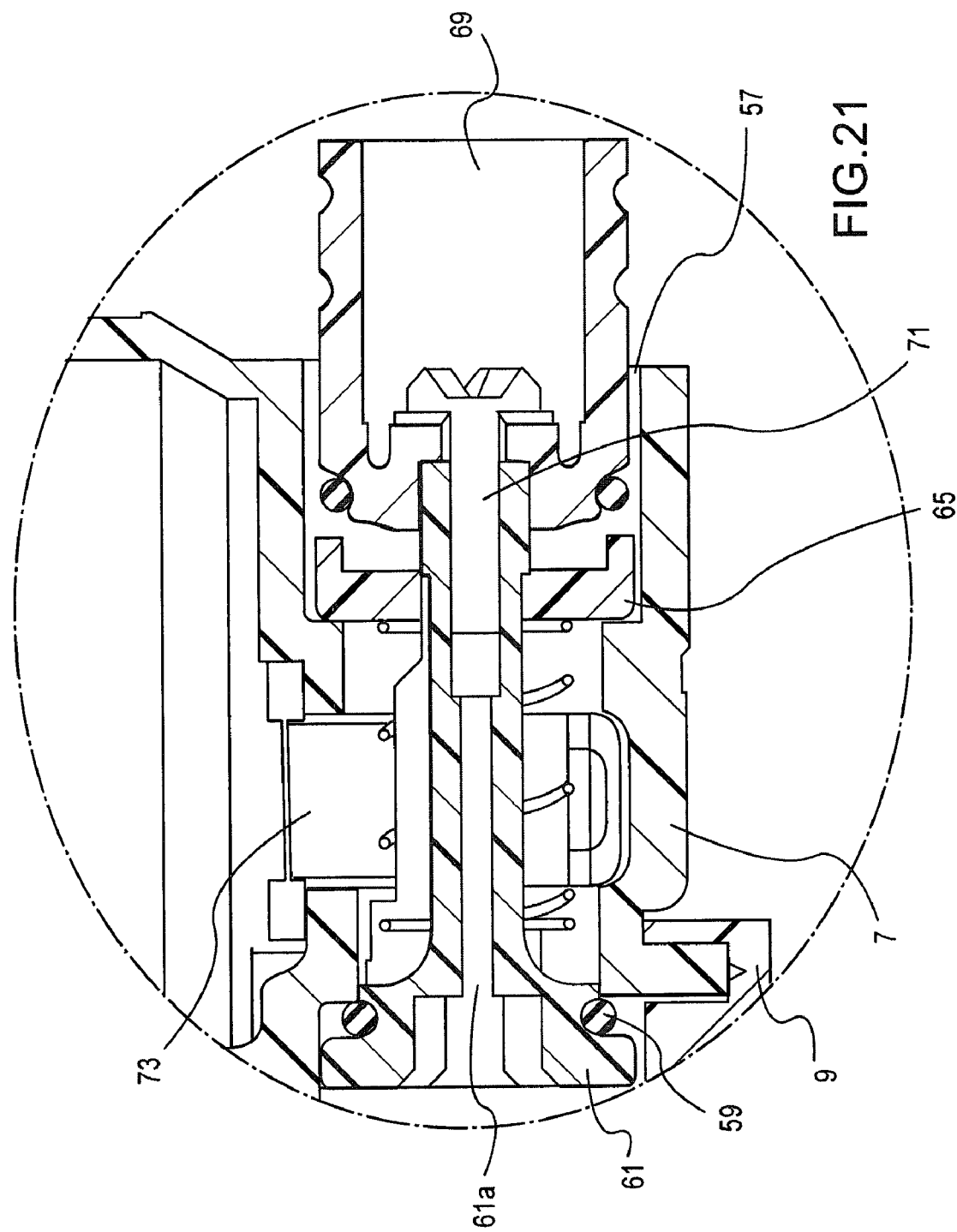
FIG. 21 is a partial cross-sectional view of valves F and G under condition II and IV.

Valve F closes due to the force exerted against valve body 61 by the water collected in main chamber 2 (e.g., lower portion 2a of main chamber) and valve G opens as a result of the lateral displacement of valve body 61. FIG. 21 shows a partial cross-sectional view of valves F and G, under condition II.

In order to drain the water collected in main chamber 2 during a watering cycle, valve F is configured to include a designed leak. As described above, the leak is created by providing through-hole 61a and drain hole 61b in valve body 61. When valve F is closed, through-hole 61a and drain hole 61b create a pathway from main chamber 2 to the outside of water sensor apparatus 1 for the collected water to flow.

Condition III.

Figure 9A:
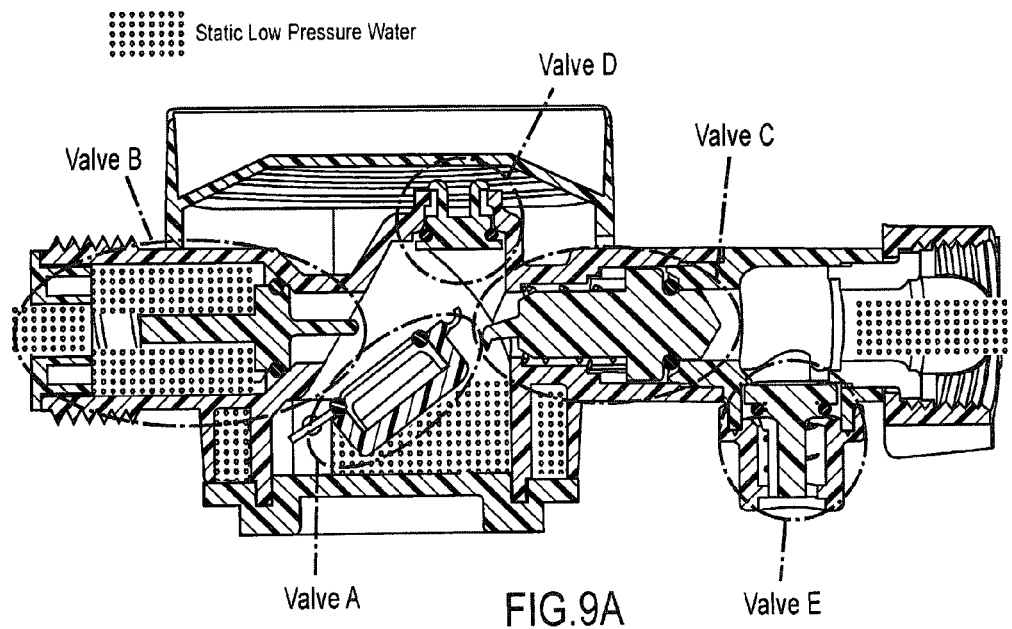
FIG. 9A is a cross-sectional view, under condition III, of the water sensor apparatus along lines 5-5 of FIG. 4.
Figure 9B:
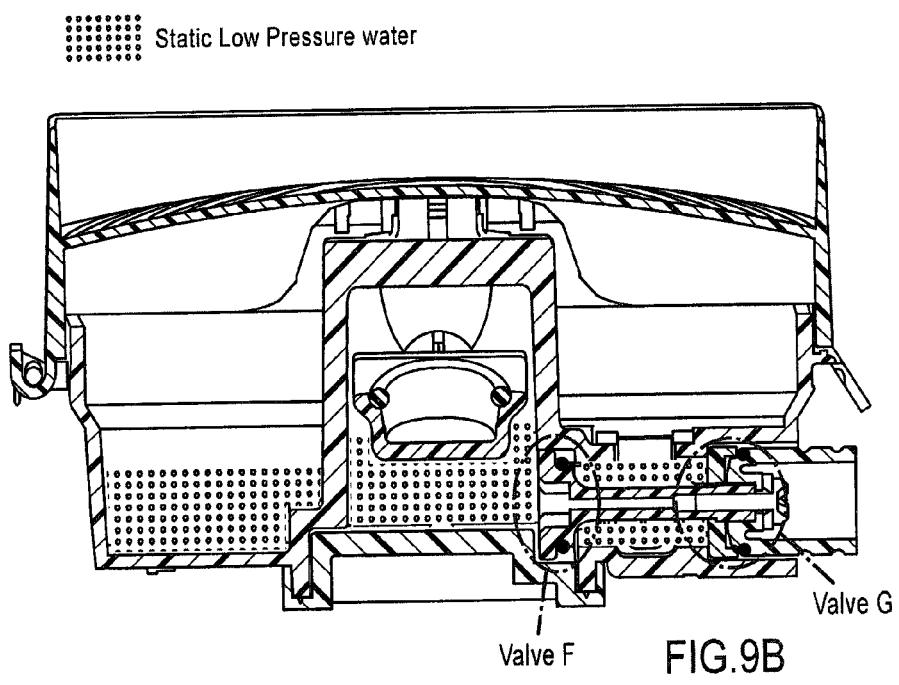
FIG. 9B is a cross-sectional view, under condition III, of the water sensor apparatus along lines 6-6 of FIG. 3.

FIGS. 9A and 9B illustrate sectional views 6-6 and 5-5 of sensor apparatus 1, respectively, under condition III (i.e., collected rain fall ≧0.50" and the water timer is off). This condition arises between watering cycles when there has been a lot of rainfall.

As explained above, when the water timer is off (i.e., no incoming high pressure water), valve C is closed and blocking portion 41 is prevented from interfering with float body A. It is understood that as the water level in chamber 2 rises, so does float body A. Under condition III, the vertical position of float body A is higher than that of blocking portion 41, because the water collected in main chamber 2 is ≧0.50. Therefore, when valve C opens (described in condition IV below), the high pressure water from the hose 150 pushes float body A against valve seat A.

Under condition III, valve B is closed (e.g., outlet block 27 is seated against valve seat B in outlet side portion 2b of main chamber 2) to prevent static low pressure water present in sprinkler 300 and sprinkler adaptor 19 from flowing back into main chamber 2.

Valve E is open (e.g., valve body 81 is biased away from valve seat E) in order to drain static low pressure water present in hose 150 or inlet chamber 23 so that such low pressure water does not flow into main chamber 2.

Valve F is open in order to create opening 55 in lower side portion 2F of main chamber 2 for rain water collected in collection chamber 4 to pass through (and thereby active valve A). FIG. 20 shows a partial cross-sectional view of valve F under condition III (e.g., valve body 61 is biased away from seat valve F).

Valve G is closed in order to prevent the rain water collected in collection chamber 4 from passing through opening 57 instead of 55 when the timer is off. FIG. 20 shows a partial cross-sectional view of valve G under condition III (e.g., valve body 69 seals drain opening 57).

Valve D is open because the pressure within chamber 2 is less than atmospheric pressure.

Next, we will describe what happens when the water timer 200 turns on when the vertical position of float body A is higher than that of blocking portion 41.

Condition IV.

Figure 10A:
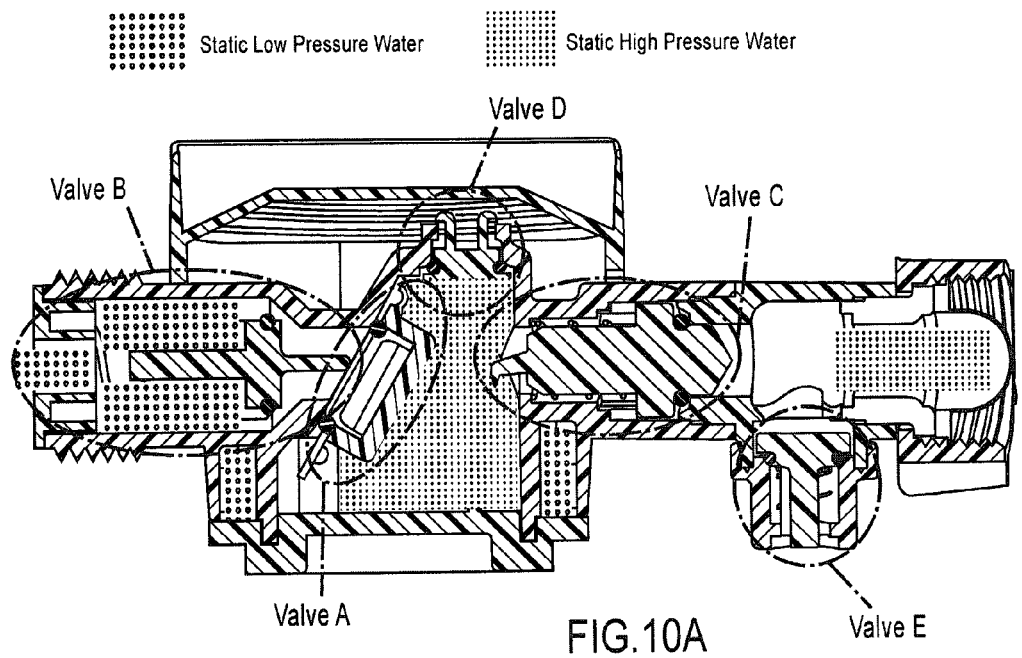
FIG. 10A is a cross-sectional view, under condition IV, of the water sensor apparatus along lines 5-5 of FIG. 4.
Figure 10B:
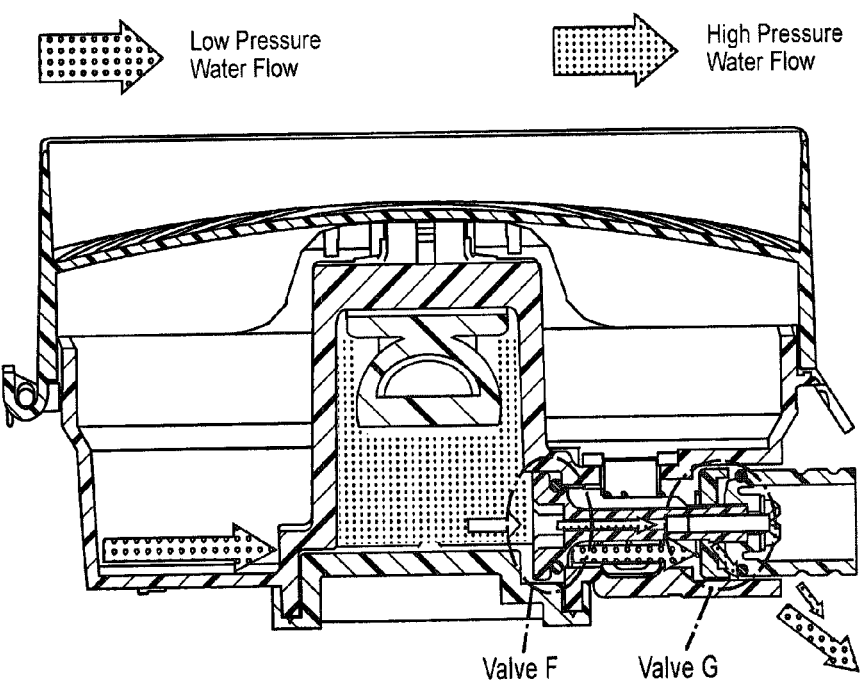
FIG. 10B is a cross-sectional view, under condition IV, of the water sensor apparatus along lines 6-6 of FIG. 3.

FIGS. 10A and 10B illustrate sectional views 6-6 and 5-5 of sensor apparatus 1, respectively, under condition IV (i.e., collected rain fall ≧0.50" and the water timer is on). This condition arises when the water timer 200 turns on after there has been a lot of rainfall.

Figure 19:
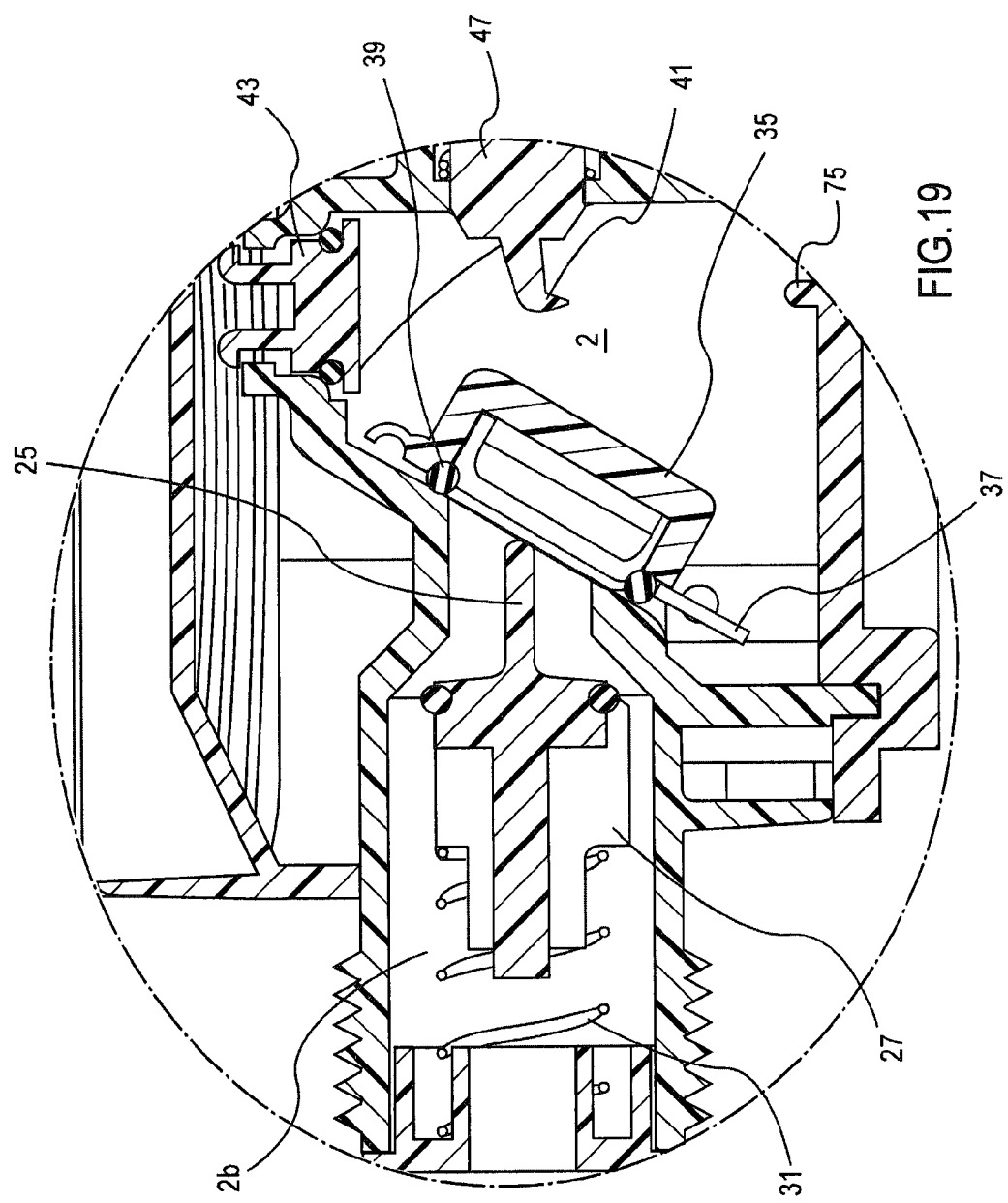
FIG. 19 is a partial cross-sectional view of valve A under condition IV.

As explained above, when the water timer is on, valve C opens and valve E closes. Under this condition, high pressure water enters main chamber 2 via inlet side portion 2c and forces float valve A, which is higher than blocking portion 41, against valve seat A, thereby closing valve A and preventing incoming water from flowing downstream to sprinkler 300. FIG. 19 shows a partial cross-sectional view of valve A under condition IV.

Under this condition, valve B opens due to the force exerted against push portion 25 of outlet block 27 by closed float valve A (e.g., force of float valve A against push portion 25 overcomes the opposing spring force acting on outlet block 27). One function of valve B in condition IV is to create a pathway for low pressure water located in sprinkler 300 and sprinkler adaptor 19 to drain to the outside of water sensor apparatus 1.

Valve D closes because the pressure within chamber 2 is greater than atmospheric pressure. FIG. 15 shows a partial cross-sectional view of valve D under condition IV (e.g., creating opening 53).

Valve F closes due to the force exerted against valve body 61 by the water collected in main chamber 2 (e.g., lower portion 2a of main chamber) and valve G opens as a result of the lateral displacement of valve body 61. Under this condition, (as described above), rain water collected in water collection chamber 4 can drain to the outside of water sensor apparatus 1. FIG. 21 shows a partial cross-sectional view of valves F and G, under condition IV.

In order to drain the high pressure water collected in main chamber 2 during a watering cycle, valve F is configured to include a designed leak. As explained above, the leak is created by providing through-hole 61a and drain hole 61b in valve body 61. When valve F is closed, through-hole 61a and drain hole 61b create a pathway from main chamber 2 to the outside of water sensor apparatus 1 for the collected water to flow.

When water timer 200 is turned off (after either condition II or IV), the water sensor apparatus 1 returns to condition I. Transition from Condition IV to Condition I.

Figure 11A:
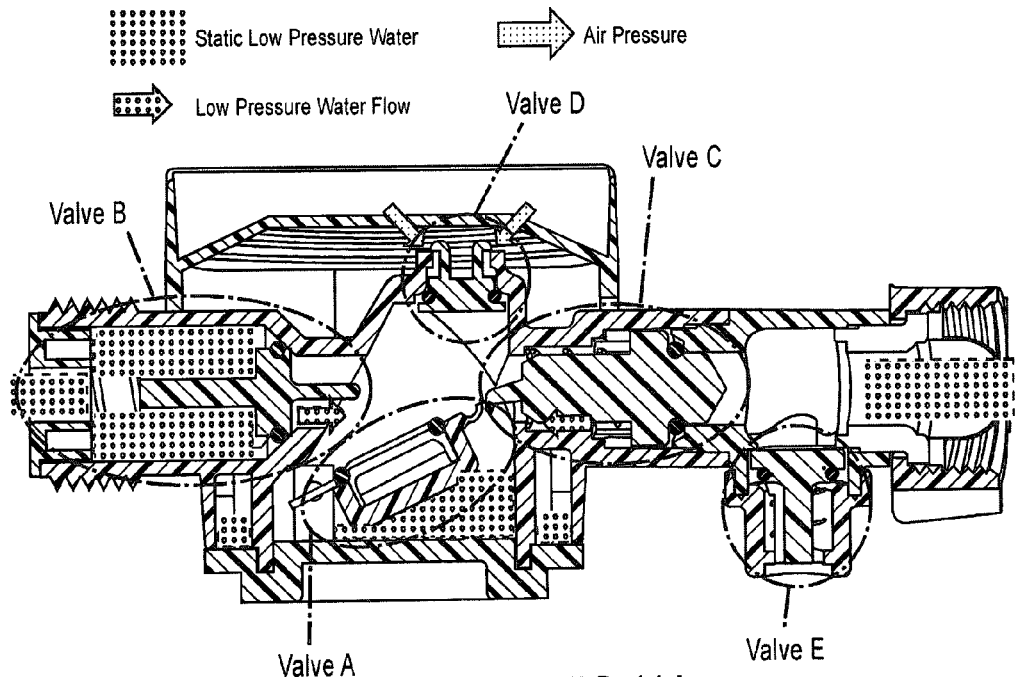
FIG. 11A is a cross-sectional view, during transition period from condition IV to condition I, of the water sensor apparatus taken along lines 5-5 of FIG. 4.
Figure 11B:
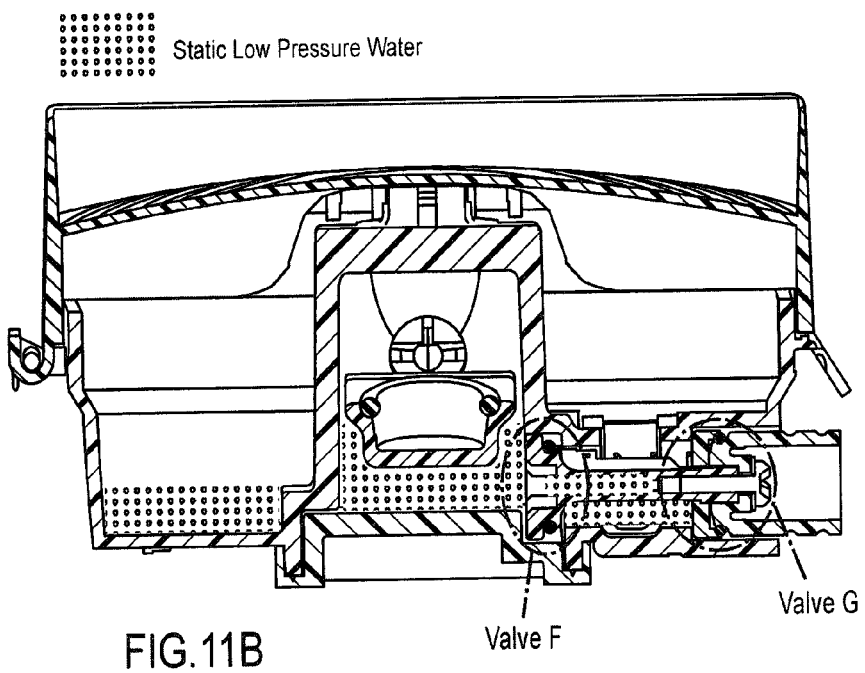
FIG. 11B is a cross-sectional view, during transition period from condition IV to condition I, of the water sensor apparatus taken along lines 6-6 of FIG. 3.

FIGS. 11A and 11B illustrate sectional views 6-6 and 5-5 of sensor apparatus 1, respectively, when the timer is turned off after condition IV. In general, when transitioning from condition IV to condition I, the water sensor apparatus 1 resets itself and drains to begin monitoring for the following watering cycle.

When transitioning from condition IV to condition I, a leak is created via valve body 61 for releasing the high pressure water accumulated in main chamber 2 in order to actuate valve D.

Figure 14:
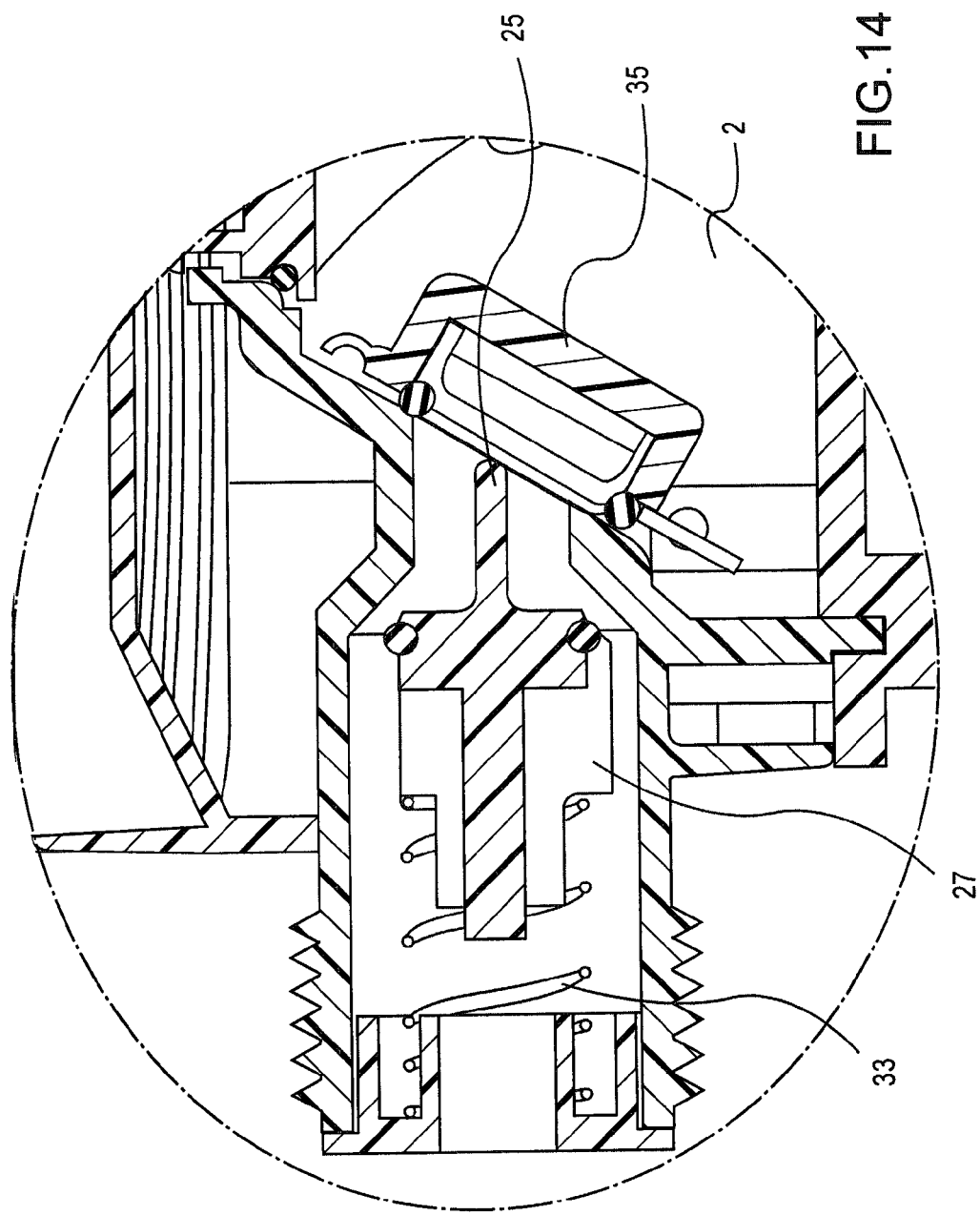
FIG. 14 is a partial cross-sectional view of valve B during transition period from condition IV to condition I.

The vertical position of valve A lowers as the water level in main chamber 2 lowers (due to drainage). Valve B closes when the spring force acting on outlet block 27 overcomes the opposing force (either high pressure water or float body A). FIG. 14 shows a partial cross-sectional view of valve B during transition period from condition IV to condition I.

Valve E opens when the spring force acting on valve body 61 overcomes the opposing force (water pressure from water collected in chamber 2). Valve F closes in order to reset sensor apparatus so that rain water collected in collection chamber 4 does not leak to ground.

There has been described a water sensor apparatus that includes a novel arrangement of chambers and valves in order to prevent water from being supplied to a sprinkler after a predetermined amount of rain has fallen in the area previously desired to be watered. It is understood that the above detailed description of the drawings is provided by way of example only. Various details of design and construction may be modified without departing from the true spirit and scope of the invention as set forth in the appended claims.

We claim:

1. A water sensor apparatus used in connection with a watering system, said water sensor apparatus comprising:
    a main housing comprising an inlet and an outlet;
    a first valve mechanism provided within said main housing;
    a valve housing portion comprising a main chamber extending generally laterally from said inlet to said outlet; and
    a base portion, wherein
    said first valve mechanism opens and closes the outlet of said main housing in response to a water level collected in said main housing and water pressure entering said inlet of said main housing, and
    said first valve mechanism is accommodated in a lower portion of said main chamber and is pivotally coupled at one end thereof to an upper surface of said base portion.

2. The water sensor apparatus according to claim 1, said main housing further comprising:
   a cover portion comprising a water filter for filtering contaminants from entering said water sensor apparatus; and
   a water collection chamber provided adjacent to said main chamber.

3. The water sensor apparatus according to claim 2, wherein said main chamber is in fluid communication with said water collection chamber.

4. The water sensor apparatus according to claim 1, further comprising a plurality of valve mechanisms accommodated in said main chamber.

5. The water sensor apparatus according to claim 1, said first valve mechanism comprising:
   a buoyant member adapted to move in a generally vertical direction in response to a rising water level within said main chamber.

6. The water sensor apparatus according to claim 4, said plurality of valve mechanisms comprising:
   a second valve mechanism disposed in an inlet side portion of said main chamber, said second valve mechanism having a closed position in which said second valve mechanism engages an inlet valve seat and blocks fluid flow from entering said main chamber, and an open position in which said second valve mechanism does not engage said inlet valve seat and allows high pressure water to flow into said main chamber; and
   a third valve mechanism disposed in an outlet side portion of said main chamber, said third valve mechanism having a closed position in which said third valve mechanism engages an outlet valve seat and blocks fluid flow from entering said main chamber, and an open position in which said third valve mechanism does not engage said outlet valve seat and allows high pressure water to flow from said main chamber to said outlet of said main housing, wherein
   said inlet side portion and said outlet side portion are approximately arranged on a same horizontal plane, and
   said lower portion of said main chamber is approximately arranged between said inlet side portion and said outlet side portion.

7. The water sensor apparatus according to claim 4, said plurality of valve mechanisms further comprising:
   a fourth valve mechanism disposed in a lower side portion of said main chamber, said fourth valve mechanism controls a flow of low pressure water from said water collection chamber to said main chamber,
   said fourth valve mechanism having an open position in which said fourth valve mechanism does not engage a fourth valve seat and creates a path for fluid to flow from said water collection chamber to said main chamber, and having a closed position in which said fourth valve mechanism engages said fourth valve seat and prevents water from flowing from said water collection chamber to said main chamber, wherein
   said lower side portion is provided on a horizontal plane below said inlet side portion and opens at one end to said lower portion of said main chamber.

8. The water sensor apparatus according to claim 7, said fourth valve mechanism comprising:
   a valve body having a water conduit extending lengthwise across said valve body, said conduit configured to drain water from inside said main chamber to outside said sensor apparatus.

9. The water sensor apparatus according to claim 7, wherein when said water level collected in said main chamber is greater than 0.125 inches, then said first valve mechanism pivots to a vertical position which interferes with said inlet side portion horizontal plane.

10. The water sensor apparatus according to claim 9, wherein said water pressure entering said main chamber is greater than 5 psi, then said first valve mechanism is forced against a first valve seat, thereby preventing high pressure water from entering said outlet side portion of said main chamber.

11. The water sensor apparatus according to claim 4, said plurality of valve mechanisms comprising:
   a fifth valve mechanism disposed in an upper portion of said main chamber, said fifth valve mechanism having an open position in which said fifth valve mechanism does not engage an overhead valve seat to introduce atmospheric pressure into said main chamber via an overhead aperture provided in said main chamber, and said fifth valve having a closed position in which said fifth valve mechanism engages said overhead valve seat to prevent pressure accumulated in said main chamber from exiting said main chamber via said overhead aperture.

12. The water sensor apparatus according to claim 6, said sensor apparatus further comprising:
   a water inlet chamber in fluid communication with an outside end portion of said inlet side portion of said main chamber;
   a relief conduit in fluid communication with said water inlet chamber, said relief conduit extending in a generally downward direction;
   a sixth valve mechanism disposed in said relief conduit, said sixth valve mechanism having an open position in which said sixth valve mechanism does not engage an overhead valve seat and allows fluid to flow from said water inlet chamber through said relief conduit to ground and having a closed position in which said sixth valve mechanism engages an overhead valve seat and prevents fluid from flowing into said relief conduit from said water inlet chamber,
   wherein said sixth valve engages said overhead valve seat when pressure inside said water inlet chamber is greater than a predetermined threshold.

13. The water sensor apparatus according to claim 7, said sensor apparatus further comprising:
   a seventh valve mechanism provided in said lower side portion of said main chamber, said seventh valve mechanism controls a flow of low pressure water from said water collection chamber to an opening in a bottom portion of said lower side portion,
   said seventh valve mechanism travels a predetermined distance to and from said main chamber in response to water pressure inside said main chamber,
   wherein said seventh valve mechanism opens and closes said opening.

14. The water sensor apparatus according to claim 6, said second valve mechanism comprises an inlet block having a blocking portion protruding from one end thereof and extending into said main chamber when said second valve mechanism is in said open or said closed position, wherein said inlet block travels approximately 0.125 inches to 0.650 inches in the lateral direction when said second valve mechanism is in said open position.

15. The water sensor apparatus according to claim 6, said third valve mechanism comprising an outlet block having a push portion extending from one end thereof into said main chamber when said third valve mechanism is in said closed position, wherein said first valve mechanism contacts said push portion to open said third valve mechanism when said first valve mechanism is in said closed position.

16. The water sensor apparatus according to claim 7, said fourth valve mechanism comprising a means for leaking water from said main chamber to said ground when said pressure in said main chamber is greater than an atmospheric pressure.

17. A water sensor apparatus comprising:
- a main housing comprising a valve housing, a cover portion, and a base portion, said valve housing comprising a main chamber and a water collection chamber;
- a float valve connected to said base and provided in a lower portion of said main housing;
- an inlet valve provided in an inlet side portion of said main chamber, said inlet valve having a closed position in which said inlet valve engages an inlet valve seat and blocks fluid flow from entering said main chamber and an open position in which said inlet valve does not engage said inlet valve seat and allows high pressure water to flow into said main chamber;
- an outlet valve provided in an outlet side of said main chamber, said outlet valve having a closed position in which said outlet valve engages an outlet valve seat and blocks fluid flow from entering said main chamber and an open position in which said outlet valve does not engage said outlet valve seat and allows high pressure water to flow from said main chamber to an outlet of said main housing;
- an overhead valve provided in an upper portion of said main chamber; said overhead valve having an open position in which said overhead valve does not engage an overhead valve seat to introduce atmospheric pressure into said main chamber via an overhead aperture provided in said main chamber, and said overhead valve having a closed position in which said overhead valve engages said overhead valve seat to prevent pressure accumulated in said main chamber from exiting said main chamber via said overhead aperture;
- a main chamber communication valve disposed in a lower side portion of said main chamber, said main chamber communication valve controls a flow of low pressure water from said water collection chamber to said main chamber, said main chamber communication valve having an open position in which said main chamber communication valve does not engage a main chamber communication valve seat and creates a path for fluid to flow from said water collection chamber to said main chamber, and having a closed position in which said main chamber communication valve engages said main chamber communication valve seat and prevents water from flowing from said water collection chamber to said main chamber,
- a drain valve provided in said lower side portion of main chamber, said drain valve controls a flow of low pressure water from said water collection chamber to an opening in a bottom portion of said lower side portion, said drain valve travels a predetermined distance to and from said main chamber in response to water pressure inside said main chamber and said drain valve opens and closes said opening, wherein said inlet side portion and said outlet side portion are approximately arranged on a same horizontal plane,
- said lower side portion is provided on a horizontal plane below said inlet side portion and opens at one end to said lower portion of said main chamber,
- said lower portion of said main chamber is approximately arranged between said inlet side portion and said outlet side portion,
- said main chamber is in fluid communication with said water collection chamber;
- said float valve travels in a generally vertical direction in response to a rising water level within said main chamber, and
- said float valve opens and closes said outlet of said housing in response to a water level collected in said main housing and a water pressure entering said inlet of said main housing.

* * * * *